(12) United States Patent
Clasquin et al.

(10) Patent No.: US 9,434,219 B1
(45) Date of Patent: *Sep. 6, 2016

(54) AUTOMATED TIRE CHANGER MACHINE, SYSTEMS, PROGRAMS AND METHODS

(75) Inventors: Joel Clasquin, Highland, IL (US); Steven K. Molbach, Ballwin, MO (US); Douglas S. Hanneken, St. Louis, MO (US); Micah N. Vaninger, St. Louis, MO (US); Charlie Polster, Edwardsville, IL (US); Peter N. Liebetreu, St. Louis, MO (US)

(73) Assignee: Hunter Engineering Co., St. Louis, MO (US)

( * ) Notice: Subject to any disclaimer, the term of this patent is extended or adjusted under 35 U.S.C. 154(b) by 788 days.

This patent is subject to a terminal disclaimer.

(21) Appl. No.: 13/365,682

(22) Filed: Feb. 3, 2012

Related U.S. Application Data

(60) Provisional application No. 61/439,728, filed on Feb. 4, 2011, provisional application No. 61/587,303, filed on Jan. 17, 2012.

(51) Int. Cl.
*B60C 25/02* (2006.01)
*B60C 25/138* (2006.01)
*B60C 25/04* (2006.01)
*B60C 25/132* (2006.01)

(52) U.S. Cl.
CPC ............. *B60C 25/02* (2013.01); *B60C 25/04* (2013.01); *B60C 25/132* (2013.01); *B60C 25/138* (2013.01)

(58) Field of Classification Search
CPC ... B60C 25/138; B60C 25/132; B60C 25/04; B60C 25/02
USPC .......................... 157/1, 1.17, 1.24, 1.26, 1.28
See application file for complete search history.

(56) References Cited

U.S. PATENT DOCUMENTS

| | | | |
|---|---|---|---|
| 7,296,351 B2 * | 11/2007 | Gonzaga | 29/894.31 |
| 8,342,223 B2 | 1/2013 | Sotgin | |
| 8,613,303 B1 * | 12/2013 | Hanneken | B60C 25/138 157/1.17 |
| 8,770,254 B1 * | 7/2014 | Hanneken | B60C 25/138 157/1.17 |
| 9,073,394 B1 * | 7/2015 | Clasquin | B60C 25/056 |
| 2006/0169414 A1 * | 8/2006 | Hillman | B60C 25/138 157/1 |
| 2008/0119962 A1 * | 5/2008 | Voeller et al. | 700/279 |

* cited by examiner

*Primary Examiner* — Robert Scruggs
(74) *Attorney, Agent, or Firm* — Mark E. Books; Bruce T. Atkins

(57) ABSTRACT

A tire changing machine including enhanced control features for automated operator of tire change procedures with operator oversight and ability to manually adjust machine operation when desired. Dead man control input, user interfaces and programs for implementing the interfaces, methods for completing tire bead seating, informational displays of wheel rim and tire information, coordinated tool positioning, and automated lubrication features are described.

18 Claims, 23 Drawing Sheets

Press pedal
to raise

No choices

Wheel lift above (44 $\frac{1}{2}$")/2
goes up all the way

Press to raise / lift to lower

If raised, press to clamp

Free to move all - no restrictions

Insert clamp

When spindle is upright and not in procedure

Lifting pedal lowers

One pedal tap clamps if not already

Then shows demount / mount choices

Free to move all - no restrictions

Constant foot pedal

Assume passenger car mode

If rotating hook, make sure it clocks back into position

Need to suggest rotating or do it automatically
Suggest auto

Diameter functions in manual mode now set for UR, LR, TH and PA

Position tire

Confirmed Positioned in Drop Center

Must confirm with foot tap

Show image of properly positioned tire

Animation would be helpful

Need way to prevent toolhead from coming back in

Diameter functions in manual mode now set for UR, LR, TH and PA

Demounting
bottom bead

Constant foot pedal

Pinched bead just lowers
and goes back to lift and
position step

Need way to prevent toolhead
from coming back in

Diameter functions in
manual mode now set
for UR, LR, TH and PA

If declamp go back to (A) status

If declamp unlock manual context

Otherwise keep manual locks in place

For impatient, tools is first choice. Once selected constant pedal no longer required See Above Constant foot pedal Might make pusher default or set up question Diameter functions in manual mode now set for UR, LR, TH and PA Constant foot pedal For impatient, tools home will be a choice. Once selected constant pedal no longer required Next press will declamp so default switches to de-clamp and tools are already home Diameter functions in manual mode now set for UR, LR, TH and PA One foot push to de-clamp Next foot push clamps When de-clamped, all manual mode diameter limitations are disabled Free to move all - no restrictions Lift pedal to
lower Lower is fully manual control Some limit to prevent raising
TC must be devised Possible memory?? Lower to
starting point of last raise Free to move all - no restrictions

AUTOMATED TIRE CHANGER MACHINE, SYSTEMS, PROGRAMS AND METHODS

CROSS REFERENCE TO RELATED APPLICATIONS

This application claims the benefit of U.S. Provisional Application Ser. No. 61/439,728 filed Feb. 4, 2011 and entitled AUTOMATED TIRE CHANGER MACHINE, SYSTEMS PROGRAMS AND METHODS, and U.S. Provisional Application Ser. No. 61/587,303 filed Jan. 17, 2012 and entitled AUTOMATED TIRE CHANGER MACHINE, SYSTEMS PROGRAMS AND METHODS, the complete disclosures of which are hereby incorporated by reference in their entirety.

This application also relates to subject matter disclosed in the following commonly owned applications which are also incorporated by reference in their entirety: U.S. patent application Ser. No. 13/312,518 filed Dec. 6, 2011 and entitled DEMOUNT TOOL ASSEMBLY AND METHODS FOR AUTOMATED TIRE CHANGER MACHINE which claims the benefit of U.S. Provisional Patent Application Nos. 61/420,543 filed Dec. 7, 2010 and 61/483,297 filed May 6, 2011; U.S. Provisional Patent Application Ser. No. 61/488,367 filed May 20, 2011 and entitled TIRE CHANGING MACHINE WITH AUTOMATED TIRE BEAD PRESSING DEVICES, CONTROLS AND METHODS; U.S. patent application Ser. No. 13/090,588 filed Apr. 20, 2011 and entitled TIRE BEAD BREAKER DEVICE AND METHODS FOR AUTOMATED TIRE CHANGER MACHINE which claims the benefit of U.S. Provisional Application Ser. No. 61/327,361 filed Apr. 23, 2010; U.S. patent application Ser. No. 12/912,448 filed Oct. 26, 2010 and entitled TIRE CHANGER WITH ROTATIONAL POSITION AND TRACKING CONTROL which claims the benefit of U.S. Provisional Patent Application Ser. No. 61/255,316 filed Oct. 27, 2009; U.S. patent application Ser. No. 12/877,430 filed Sep. 8, 2010 and entitled TIRE CHANGING MACHINE WITH AUTOMATED TIRE BEAD PRESSING DEVICES, CONTROLS AND METHODS which claims the benefit of U.S. Provisional Patent Application Ser. No. 61/308,602 filed Feb. 6, 2010 and 61/240,771 filed Sep. 9, 2010; U.S. patent application Ser. No. 12/504,217 filed Jul. 16, 2009 and entitled TIRE CHANGING MACHINE WITH FORCE DETECTION AND CONTROL METHODS which claims the benefit of U.S. Provisional Patent Application Ser. No. 61/081,454 filed Jul. 17, 2008; and U.S. patent application Ser. No. 12/358,760 filed Jan. 23, 2009 and entitled TIRE CHANGING METHOD AND MACHINE WITH ANGULARLY POSITIONABLE DRIVE AXIS which claims the benefit of U.S. Provisional Patent Application Ser. No. 61/023,762 filed Jan. 25, 2008.

BACKGROUND OF THE INVENTION

The field of the invention relates generally to tire changer machines, systems and methods and more specifically to interactive tire changer machines, systems and methods for selective automated operation of various aspects of tire change procedures.

The process of removing a tire from a wheel rim and replacing it with another tire, referred to herein as tire changing, can be difficult. In response to such difficulties, machines have been developed to facilitate the tire changing process. The machines commonly include a clamping mechanism and a drive assembly that rotates the wheel rim about an axis. A bead breaker tool exerts pressure on the tire adjacent the wheel rim to break the tire bead seal, and a tire removal tool, sometimes referred to as a demount tool, is used to pull the bead of the tire off the wheel rim as the wheel rim is rotated, allowing the tire to be separated from the rim for removal. Manual or machine implemented tools are also utilized to press the tire onto the wheel rim for installation. While known machines have obtained some level of success in reducing the time and labor associated with changing a tire, there remains room for improvement.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
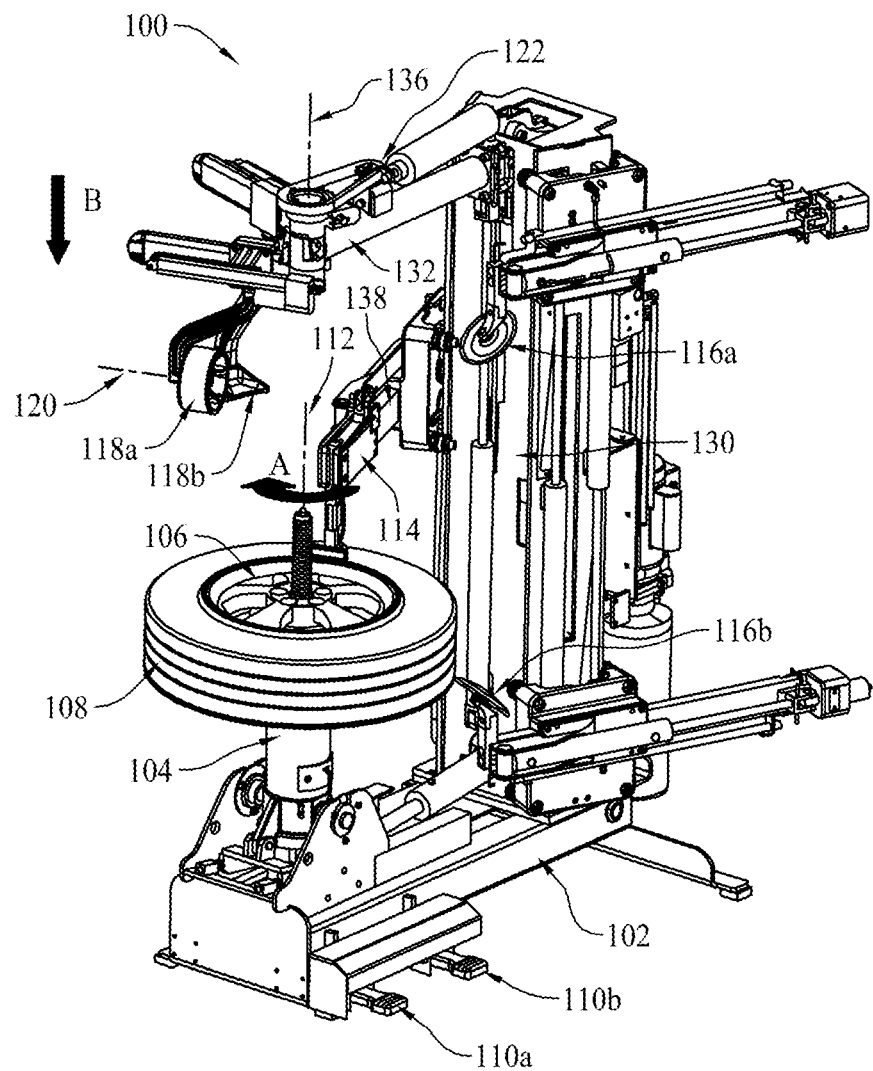
FIG. 1 is a perspective view of an exemplary embodiment of a tire changing machine.

Exemplary tire changer machines are disclosed hereinbelow that overcome numerous difficulties and disadvantages in the art. In order to understand the invention to its fullest extent, some discussion of the state art and difficulties associated therewith is warranted. Accordingly, Part I below discusses the state of the art and associated problems and disadvantages, while Part II below describes exemplary embodiments of the invention and related methods that overcome difficulties and drawbacks of the state of the art.

Part 1: Introduction to the Invention

Conventionally, tire changing machines have required manually operated hand tools, commonly refereed to as levers, to extract tires from a wheel rim. The use of such levers requires much effort and skill on the part of the machine operators to effectively remove a tire from a wheel rim without damaging the wheel rim. In today's marketplace involving a wide variety of wheel rims and tires, some of which are stiff walled and very difficult to change using levers, many tire changer machine manufacturers have sought to implement machine tools that render such lever tools unnecessary. A variety of tire demount tools exist for this purpose on modern tire changer machines. Such machines are sometimes referred to as "lever-less style" machines.

Most tire changer machines, even lever-less style ones, presently available operate under full manual control of a skilled person such as a trained machine technician. Due to changes in the tire industry which have resulted in a proliferation of larger diameter tires, tires having shorter sidewalls, and tire having very rigid sidewalls providing run-flat capabilities, modern tires are becoming increasingly difficult to service by traditional, substantially manually performed methods using tire changing machines. Because of such difficulties, efforts are underway to automate aspects of tire change procedures in order to offer power and speed advantages to the technician. Automating tire change procedures can avoid certain problems presented by certain tire and wheel rim combinations.

Examples of such problems encountered when changing modern tires are discussed in the related applications referenced above, and include difficulties in clamping certain types of wheel rims without damaging them, managing excessive amount of force generated with machine tools, positional conflicts between components of the machines and portions of the wheel rim and tire, properly accounting for sensitive tire and wheel rim features such as the presence of tire pressure monitoring systems (TPMS) sensors, properly accounting for variations in the inner geometry in the wheel rims, an inability to dislodge and grab certain tire beads, a tendency of some machine tools to become "stuck" in demount operations, a tendency of pusher tools to slip on the surface of certain tire sidewalls, and difficulties associated with pushing large and stiff walled tires to seat the tire beads on certain types of rims.

Efforts to automate aspects of tire change procedures for tire changing machines are now underway. An exemplary procedure that would be advantageous to automate is the demounting of the upper tire bead from the wheel rim. In contrast to traditional tire changer machines that largely rely on the technician using a bead lever and brute force to lift the tire bead off of the wheel, a modern lever-less tire changer no longer depends on the bead lever or the technician's strength to lift the tire bead off of the wheel. Various mechanisms have been designed in lever-less machines with most of them incorporating a pneumatic actuator to apply the force required to lift the bead off the wheel. Such lever-less machines are nonetheless susceptible to one or more of the problems discussed above, any of which can frustrate demounting of a tire, and thus have not completely solved vexing needs in the marketplace to provide effective tire changing capability for a full range of modern tires and wheel rims. Effective automation of tire change procedures therefore remains somewhat elusive to machine manufacturers, and the problems mentioned above can frustrate machine users.

Tire changing machine providers and users would each benefit from effective automation procedures.

Part II: Inventive Tire Changer Machines, Systems and Methods

Exemplary embodiments of interactive tire changer machines and systems are described below that overcome the difficulties and disadvantages explained above. Method aspects will be in part apparent and in part specifically discussed in the disclosure below.

FIG. 1 illustrates an exemplary tire changing machine 100 including a frame or base 102 and a rotatable drive shaft assembly 104 attached to the base 102. The drive shaft assembly 104 may include a post or shaft positioned centrally on the base 102, and the shaft is adapted to receive and retain a wheel rim 106 having a tire 108. The wheel rim 106 may be secured to the drive shaft assembly 104 with a clamping mechanism after the wheel rim 106 and tire 108 is loaded and mounted onto the machine 100. In an exemplary embodiment, the clamping mechanism may be as described in the commonly owned U.S. patent application Ser. No. 12/358,760 filed Jan. 23, 2009 and may therefore accommodate certain types of tires and wheel rims that conventional tire changing machines may not. In other embodiments, alternative clamping mechanisms known in the art may be utilized. The drive mechanism 104 may also, as described in U.S. patent application Ser. No. 12/358,760 be configured for movement in different positions to assist with tire lifting and associated procedures to mount the wheel rim 106 to the drive assembly 104.

After the wheel rim 106 is clamped in position, a machine operator manipulates an input selector 110a which operates the drive shaft assembly 104 to rotate the wheel rim 106 and tire 108 about a drive axis 112. In different exemplary embodiments, the drive shaft assembly 104 may be pneumatically or hydraulically actuated or powered electrically. In another embodiment, a rotating turntable or other mechanism may be provided in lieu of the drive shaft assembly 104. Clockwise and counterclockwise rotation about the axis 112, indicated by the arrow A, are possible in different embodiments.

While the drive axis 112 is illustrated as being generally vertical in the embodiment depicted, the axis 112 may be oriented horizontally or otherwise in other embodiments, and the axis 112 may be selectively positionable in different positions relative to the base 102.

As the wheel rim 106 is rotated about the axis 112 as shown by arrow A, a tool assembly 114 may be brought into physical contact or engagement with the tire 108 in the direction of arrow B at respective locations proximate an outer periphery of the rim 106. With the tool assembly 114 in the proper position with respect to the tire 108 and wheel rim 106, the tire 108 and wheel rim 106 are rotated about the axis 112 in the clockwise or counterclockwise direction of arrow A with the tool assembly 114 engaged to the tire 108 to demount the tire 108 as explained below. Additionally, the tool assembly 114 may be utilized to mount a tire 108 to the wheel rim 106. While a single tool assembly 114 is shown that is capable of mounting and demounting tires from the wheel rim, it is contemplated that separately provided mounting and demounting tools may likewise be provided and utilized.

The tool assembly 114 may include features to separate or displace an inner circumference of the tire 108 including a tire bead (not shown in FIG. 1) over the outer lip of the wheel rim 106 to remove the tire 108 in a tire demount operation, or alternatively to engage the inner circumference of the tire 108 including the tire bead in a tire bead seat of the wheel rim 106 to install or mount the tire 108 to the wheel rim 106. The tool assembly is further described in U.S. Patent Application Ser. No. 61/420,543 and the reader is referred thereto for further details. The tire 108 may be appropriately lubricated to facilitate easier removal and installation using the tool assembly 114.

Machine tools 116a, 116b are provided, and sometimes referred to as bead breaker tools that exert pressure on the tire 108 to either break the tire bead seal with the rim 106 or push or displace the inner circumference of the tire 108 over the outer lip of the wheel rim 106 to install the tire 108. As shown in the exemplary embodiment in FIG. 1, two tools 116a and 116b are shown, one located above the tire 108 and the other located below the tire 108. In another embodiment, a single bead breaker tool 116 could be provided. Exemplary operation of the bead breaker tools 116 are more completely described in U.S. patent application Ser. No. 12/504,217 and the reader is referred thereto for further details.

Machine tools 118a and 118b are also provided and sometimes are referred to as pressing tools, pusher tools, or bead pressing devices. As shown in the exemplary embodiment in FIG. 1, bead pressing devices 118a, 118b are shown that exert pressure on the tire sidewall in tire mounting and demounting procedures. In the exemplary embodiment shown differently configured bead pressing devices 118a and 118b are shown.

The bead pressing device 118a, is a roller device that is mounted for rotation about an axis 120 that is substantially perpendicular to the machine drive axis 112. Thus, when the roller device 118a is placed in contact with the tire sidewall, it may rotate about the axis 120 as the tire 108 is rotated about the machine drive axis 112 while the device 118a remains in a fixed position relative to the machine drive axis 112. When desired, the roller device 118a is also operable wherein it may rotate in tandem with the tire 108 about the drive axis 112.

The bead pressing device 118b is adapted for contact with the tire 108 and includes a frictional engagement surface to facilitate movement relative to the tire. When engaged to the tire sidewall, the pressing device 118b rotates about the drive axis 112 with the tire 108. Optionally the pressing device 118b may incorporate a feature that engages a spoke, a hole, or other feature of the wheel rim 106 to ensure that the pressing device 118b (and also the tire 108 with which it is engaged) rotates along with the wheel rim 106 and that the pressing device 118b does not move relative to the wheel rim 106. Alternatively, the pressing device 118b may optionally be coupled with an independent drive mechanism 122 that pushes the bead pressing device 118b and the tire 108 in the direction of rim rotation about the drive axis 112. This is sometimes referred to as establishing a "traction point" in addition to pushing the tire bead into the drop center of the wheel rim 106 when mounting the tire 108.

The pressing tools 118a, 118b may be spaced from one another to maintain the tire bead in a drop center of the wheel rim 106 during tire demounting procedures, or to push the tire bead into the drop center in a tire mounting procedure. While two bead pressing devices 118a and 118b are shown in FIG. 1, additional bead pressing devices 118 may be provided. Two or more bead pressing devices 118 are beneficial for mounting or demounting larger diameter tires and stiffer tires, although it is understood that in some cases a single bead pressing device 118 may be sufficient to mount or demount certain types of tires. Operation of the pressing tools and the independent drive mechanism are more completely described in U.S. patent application Ser. No. 12/877,430 and the reader is referred thereto for further details.

The tool assembly 114, and the tools 116, 118 serve to supply sufficient tire insertion or removal forces at the correct angle and location with respect to the tire 108 such that the bead 118 of the tire 108 is forced out of or onto a bead seat on the wheel rim 106. While exemplary tools 116, 118 are illustrated in combination with the tool assembly 114, still other tire changing tools and devices may be provided and used for bead breaking, tire mounting and/or demounting, locating a valve stem, locating a wheel weight, locating a wheel sensor such as a Tire Pressure Monitoring System (TPMS) sensor, or other purposes. Such other tools may be provided in addition to or in lieu of the tools 116, 118 as depicted.

To assist with locating the tool assembly 114 and the tools 116, 118 a sensory capability may further be provide in the machine 100 to detect a position of the tool assembly 114 and the tools 116, 118 (or perhaps other tools that may be provided) with respect to the tire 108 and/or wheel rim 106. For example, one known tire changing machine includes a switch mechanism that changes state when the bead breaker tool moves just beyond the outer edge of the rim, ensuring that the bead breaker is positioned to engage a tire at a predetermined location. Machine vision systems are also known that help align the machine tools with respect to the wheel rim at predetermined locations. As another example, force feedback sensors may be integrated as further monitoring and control features for the machine components, including but not limited to the machine tools, in use. While such sensory capabilities may be beneficial, in some embodiments they may be considered optional and accordingly not be utilized.

The exemplary machine 100 as shown also includes a support tower 130 extending from the base 102 at a location spaced from the drive assembly 104, and the support tower 130 extends to a height well above the tire 108 and rim 106. A linkage 132 extends outwardly from the support tower 130, and the pressing tools 118a, 118b are coupled to the linkage 132. The linkage 132 is movable by an actuator on the support tower 130 in a direction parallel to arrow B in FIG. 1, such that as the linkage 132 is moved, the bead pressing devices carried on the linkage 132 are moved toward or away from the tire 108. As such, the bead pressing devices 118a, 118b may be moved in a direction parallel to the machine drive axis 112.

Also, the bead pressing devices 118a, 118b are mounted to the linkage 132 such that they are rotatable about an axis 136 that is fixed and coincident with the machine drive axis 112 in a tire change procedure. That is, the pressing devices 118 are rotatable about the axis 136 that is coaxial with the machine drive axis 112. As such, because the axis 136 is coincident with the drive axis 112, when the bead pressing devices 118 are in contact with the tire 108, the bead pressing devices 118 may rotate with the tire 108 as it is rotated about the drive axis 112. Unlike conventional tire changing machines, including but not limited to so-called swing-arm style machines, the rotational axis 136 for the pressing devices 118 is fixed at a set distance and location from the tower support frame 130 in an exemplary embodiment. A more compact machine arrangement and work area is therefore provided compared to some conventional machines.

While locating the rotation axis 136 of the pressing devices 118 at a fixed and set distance and location from the tower support frame 130 can be beneficial for the reasons stated, it is recognized that in further and/or alternative embodiments neither the location of the drive axis 112 nor the rotational axis 136 for the pressing devices need necessarily be fixed in such a manner so long as the axes 112 and 136 are positionable to become coincident when the pressing devices 118 are needed. That is, either or both of the axes 112 and 136 may be movable to different operating positions, distances and orientations relative to each other and relative to the tower support frame 130 for reasons not pertinent to use of the pressing devices 118a, 118b, but when the pressing devices 118a, 118b are to be engaged to the tire, the axes 112 and 136 are moved to become coincident once again so that the bead pressing devices 118 may rotate with the tire 108 about the drive axis 112.

The bead pressing devices 118a, 118b are further movable in a direction perpendicular to the axis 136 and the drive axis 112. That is, actuators are provided that move the bead pressing devices 118a, 118b toward and away from the drive axis 112, such that the bead pressing devices 118 may be manually or automatically adjusted to different radial positions measured from the drive axis 112 to accommodate tires and rims of different diameters. The bead pressing devices 118 may also be manually or automatically positioned in the direction perpendicular to the drive axis 112 as described below.

The bead breaker tools 116a, 116b are also coupled to and supported by the tower support frame 130 (or other support structure in an alternative embodiment) via linkages that also movable in vertical and horizontal directions to position the bead breaker tools 116a, 116b relative to the wheel rim 106 and tire 108 for use.

The tool assembly 114 is likewise coupled to a support 138 and associated linkages on the tower support frame 130, such that the support 138 is movable relative to the tower support frame 130 with actuators in vertical and horizontal directions. As such, the tool assembly 114 is movable toward and away from the drive axis 112 in a radial direction, and toward and away from the tire 108 and wheel rim 106 in a direction parallel to arrow B. The tool assembly 114 in the illustrated embodiment is independently positionable from the tools 116, 118, although it is understood that the assembly 114 and the tools 116, 118 may be used in concert while changing the tire 108. Also, while the tool assembly 114 and the tools 116, 118 are all coupled to the same tower support frame 130 in the exemplary embodiment depicted, they could alternatively be supported with independent support frames and structure that is separately provided on the machine 100 in view of a single tower support frame 130.

The positions of the tool assembly 114 and the tools 116, 118, and operation of the drive assembly 104 and other features of the machine 100 may be coordinated by a control unit that may include a controller (discussed below) and actuator components operatively connected to the controller.

A machine operator may manipulate input selectors 110a, and 110b, for example, which communicate with the control unit to move the tool assembly 114, and the tools 116, 118 to desired positions and/or to operate the drive assembly 104 or activate other machine features. In illustrative embodiments, the input selectors 110a, 110b may be foot pedals located near the bottom of the machine base 102 for convenient use of the machine operator(s). In other embodiments, other known input selectors, including but not limited to levers, buttons, knobs, switches, joysticks, and touch sensitive screens may be employed in various locations on or near the machine 100. An operator station including a display and an input device including a keyboard or other input selectors may be optionally provided for the benefit of the operator. Still other features of the machine may be provided, such as tire inflation systems and the like familiar to those in the art.

As described in the related applications referenced above, to which the reader is referred for further details, various ways of automating certain tire change procedures using force and position feedback sensors and the like have been proposed that facilitate automated machine operations and avoid human error and numerous difficulties heretofore experienced in operating the machine tools to change tires with varying degrees of involvement by human operators. Indeed, substantially fully automated tire changing from start to finish is believed to have been enabled in which no human assistance is required to mount or demount a tire, other than to start the applicable mount or de-mount mode when ready. Improvements are, however, desirable. Specifically, it is desired to make the machines easier, safer and more enjoyable to use.

Figure 2:
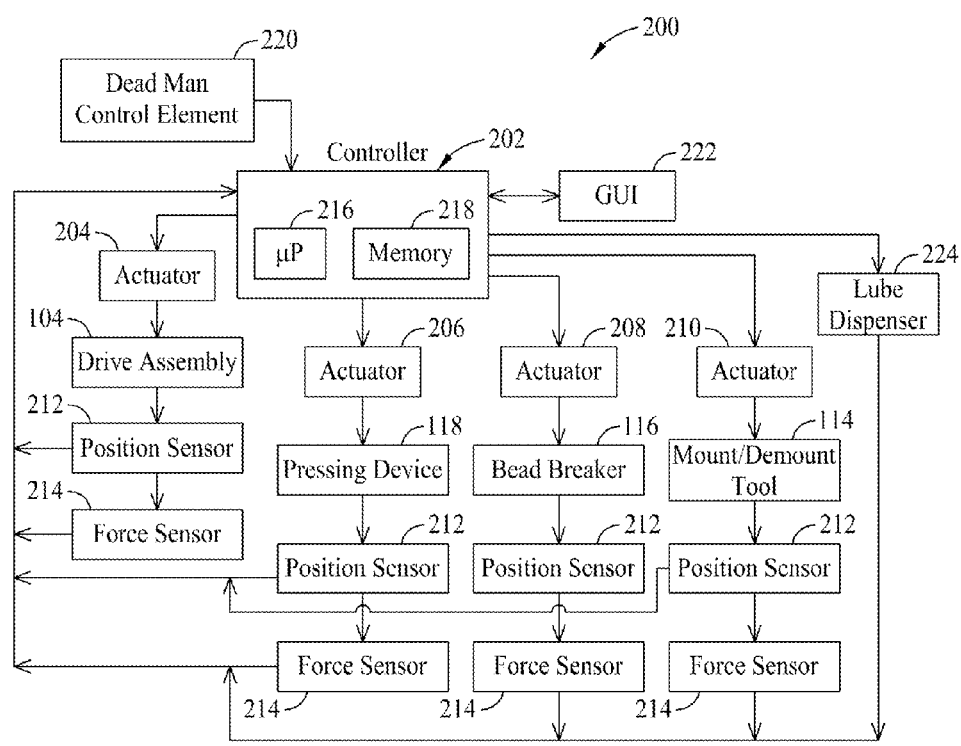
FIG. 2 is a block diagram of an exemplary control system for the tire changing machine shown in FIG. 1.

FIG. 2 schematically illustrates an exemplary control system 200 that may be implemented in the machine 100 for more optimal use and control of the machine 100 to change tires in an automated, but interactive manner with a human operator of the machine. Using the control system 200, tire change procedures can be substantially automated such that little or no operator input is required, but nonetheless allowing human operators an ability to control, oversee and adjust machine operation if needed or as desired. The control system 200 can provide the benefits of full automation of certain aspects of tire change procedures while leaving other aspects in the discretion and manual control of the machine operator. As such, varying amounts of operator participation in tire demount procedures can be provided. Interactive, intuitive control schemes are provided for the operator's benefit as explained below.

As shown in the embodiment of FIG. 2, the control system 200 generally includes a controller 202 operatively coupled to various actuators directing the various tools provided on the machine 100. More specifically, the controller 200 is operatively coupled to an actuator 104 associated with the drive assembly 104, an actuator 206 associated with one of the pressing devices 118, an actuator 208 associated with one of the bead breakers 116, and an actuator 118 associated with the mount and de-mount tool assembly 114. Position sensors 212 and force sensors 214, such as those described in U.S. patent application Ser. Nos. 12/912,448 and 12/877,430 may be provided to provide closed loop control feedback as shown, and to position the tools in the appropriate locations for particular tire change procedures in an automated manner.

The actuators 204, 206, 208 and 210 may each correspond to multiple actuators to drive the associated components and effect movement therefore in three dimensional space. Rotational movement be provided, for example, with the actuator 204 for the drive assembly 104. Linear movement in vertical and horizontal directions, for example, may be provided by different actuators associated with the machine tools 114, 116 and 118. Using the respective actuators, the drive assembly 104 may be operated to rotate the wheel rim 106 and tire 108 about the drive axis 112 to and from desired rotational positions, a radial position of the machine tools 114, 116, 118 measured in a direction perpendicular to the drive axis 112 (FIG. 1) can be adjusted to meet varying diameters of wheel rims 106 and tires 108, and axial positions of the tools 114, 116, 118 may be adjusted along an axis parallel to the drive axis 112 to engage or disengage the tools to and from the tire 108. The tools 114, 116, 118 may therefore apply appropriately directed pressure at the appropriate locations on the tire 108 to mount or demount the tire 108 to and from the wheel rim 106.

As still another option, further feedback elements such as machine vision elements may be provided in the control system 200 to facilitate automated positioning of the drive assembly 104 tools 114 without the machine having prior knowledge of a rim type or tire type involved in the demount procedure. In such scenarios, the profile needed to position the tool assembly 114 may be self-identifying to the machine 100.

Optionally, the controller 202 may also be coupled a spindle actuator (not shown in FIG. 2) that moves the drive axis 112 (FIG. 1) laterally relative to the machine base 102. Thus, for example, in such an embodiment the drive axis 112 (and also the tire 108 and wheel rim 106 coupled to the drive axis 112 with the clamping mechanism) may be moved by the spindle actuator in a direction generally perpendicular to the drive machine axis 112, such as a direction extending toward or away from the tower support frame 130 shown in FIG. 1. A machine equipped with such a spindle actuator may therefore move the drive axis in a radial direction 112 toward and away from the various tools 114, 116 and 118. The spindle actuator may likewise be equipped with force and position sensors providing an ability for automated, closed loop control of the actuator.

In various embodiments, the controller 202 may be, for example, a microcomputer, a programmable logic controller, or other processor-based device. Accordingly, the controller 202 may include a microprocessor 216 and a memory 218 for storing instructions, control algorithms and other information as required for the machine 100 to function in the manner described. The controller memory 218 may be, for example, a random access memory (RAM), or other forms of memory used in conjunction with RAM memory, including but not limited to flash memory (FLASH), programmable read only memory (PROM), and electronically erasable programmable read only memory (EEPROM). Alternatively, non-processor based electronics and circuitry may be provided in the controller 202 with equal effect to serve similar objectives. For example, a supercapacitor may be provided to give the controller time to store procedure sensitive data such as the current state in a software based state machine in the event of power loss. Other elements such as line filters and capacitors for filtering noisy power may be included. Disk storage such as a CD-ROM, DVD, or hard disk may be provided for storage of various tire profiles that may be recalled to optimize tire mount or demount processes. The tire profiles may include detailed data regarding dimensional aspects of tires to be changed and other information concerning the tires that may be useful and beneficial to the machine operator or the control system.

In various exemplary embodiments of the control system 200, the actuators 204, 206, 208 and 210 may respectively include hydraulic cylinders, pneumatic actuators, electric motors, or still other types of actuators. The actuator types for the actuators 204, 206, 208 and 210 may be of the same or different type (e.g., hydraulic, pneumatic, electric or other) in numerous variations of machines.

Likewise, in various exemplary embodiments, the position sensors 212 utilized in the control system 200 may include positioning encoders, proximity switches or other switch devices, Hall Effect sensors, machine vision elements and other sensors and technologies known in the art. More than one type of positioning sensor or sensing technology may be utilized in numerous variations of machines with similar effects.

The control system 200 may also include a dead man control element 220 described further below, and a graphic user interface (GUI) 222 also described below. The dead man control element 220 and GUI 222 allow for limited control of the automated functionality of the machine as well as informative informational feedback for the operator regarding execution of automated tire change procedures. The control system 200 may operate and implement the exemplary processes described below to facilitate the functionality described.

Interactive tire machines, systems and methods are disclosed hereinbelow for implementation with the control system 100 that advantageously perform tire change procedures in an interactive manner with a human operator of the machine. The human operator is provided with real time information, instruction and feedback as to particular aspects of procedures being performed so that the operator can become familiar with the procedures, as well as providing the operator a limited ability to control the procedures being performed. Operator interest and enjoyment in machine operation is therefore greatly enhanced and improved operator convenience is provided. The operator may enjoy the benefits of full tire change automation and still contribute to its operation in an engaging and interesting way.

A. Dead Man Control Features

Ideally, full automation of the machine 100 would fully complete tire mounting and demounting procedures without any human intervention or oversight. As a practical matter, however, in the operation of an automated tire changing machine it is desirable for a human operator to maintain at least some level of control over, and interest in, the various procedures being performed by the machine 100. Safety concerns can be presented by inattentive operators or to nearby persons who may not be aware that the machine is operating.

A skilled human operator can also complement the machine operation, and a skilled human operator may be invaluable if certain error conditions are anticipated or encountered as the machine is executing the various procedures proscribed. To do so, however, the human operator needs a good understanding of the tire change procedures being utilized by the machine, how the machine actually works to accomplish them, and what options are available to take corrective action or otherwise achieve desired results.

As used herein, a procedure shall refer to a controlled movement of one or more machine components for a particular purpose to accomplish a task in a tire change process executed with the machine. A procedure may include a single step or movement involving a single actuator and a single component of the machine (e.g., the drive assembly 104 or the tools 114, 116, 118), multiple steps or movement involving a single actuator or component, single steps or movements of multiple actuators and components, or multiple steps or movements of multiple components. Exemplary procedures for different purposes are described further below.

In exemplary embodiments, an operator may select, using the GUI 222 described below, a specific procedure or procedures to be run from available procedures stored in the controller memory 218, and therefore provide an input to the machine concerning which of the various tire change procedures is desired, and to some extent the order that the procedures that may be executed.

Likewise, with or without assistance of the GUI 222, a human operator may manipulate one or more input selectors or control elements that cause execution of a specific automated tire change procedure such as, for example only, a wheel lift procedure, a lower tire bead loosening procedure, an upper tire bead loosening procedure, and an upper bead demounting procedure, among others. A number of other procedures and control routines and algorithms are described in the related applications and may likewise be selected, including but not limited to locating tire valve stems, locating TPMS sensors, locating wheel weights, and locating machine tools in proper locations. Such selection of specific procedures may be advantageous when certain procedures are known to the operator to be inapplicable. For example, if it is known that a given wheel rim does not include wheel weights or if it is known that TPMS sensors are not included, procedures designed to detect them wheel weights or TPMS sensors need not be run to successfully complete a tire change.

In another embodiment a machine operator may more generally select a larger procedure that incorporates multiple specific procedures with the end result being, for example, complete tire removal or complete tire mounting. For example, rather than selecting specific procedures, the operator may simply select a tire mount mode or a tire demount mode. When the mount or demount modes are selected, the controller 202 recalls and runs in series all the various procedures pertinent to the mode selected. This may result in slower tire change times, however, as the machine may in such instances run wheel weight detection and TPMS sensor detection procedures when in fact, none are present.

In either case, the tire changing machine 100, and more specifically the controller 202 may include a memory 218 for storing information related to an automated tire change procedure or series of procedures. The information may include motion paths, data points and other information for operating the machine components to rotate the wheel rim and tire, and to engage and disengage the various machine tools with the tire at appropriate locations. Force and position profiles associated with each of the machine components may be loaded in the controller memory 218 or in other memory associated with the control system 200 and compared to actual conditions while the machine is used to make control decisions as explained in the related applications. In other embodiments, however, absolute predefined motion paths for the machine components may be stored in the controller memory and executed in an open loop control scheme.

The tire changing machine 100, by virtue of the control system 200, may also include an operational mode where a manually performed aspect of a procedure determined by a human operator is saved and recorded into memory 218, for example, for future recall and use by the machine 100. That is, the human operator can manually position the machine tools or other components to perform some or all of a procedure, and the controller 202 can remember the positioning path of the tools utilized if the operator chooses to save the manually performed procedure. As such, in addition to having multiple pre-programmed automated procedures, the machine 100 may "learn" new and additional procedures as needs arise or according to operator preference.

For example, while the machine 100, and more specifically the controller 200, can be pre-programmed with various algorithms to execute various procedures on a great variety of different wheel rims and tire sizes, an operator may determine that a variation from the pre-programmed procedures is needed or desirable, to complete the procedure on certain wheel rim and tire combinations. In the example of starting positions for the tools, the machine 100 may intelligently learn and repeat appropriate start positions for tire demount procedures with some operator assistance. For example, an operator may manually position the tool assembly 114 relative to any given wheel rim 106, and the controller 202 may save the vertical and horizontal positions known to it via the sensors to create profiles for future use and recall for tires and rims of similar types, which can be linked to identifiers provided by an operator or otherwise selected on the machine 100. Thereafter, a machine operator can enter or select the identifier and the controller 202 can automatically operate the actuator 210 to move the mount and demount tool 114 to the corresponding start position(s).

In still another embodiment, the controller 202 may be pre-programmed with predetermined start positions, or otherwise retrieve start positions from a database or other source, and use those start positions to execute pre-programmed tire change procedures. In such a scenario, the machine operator need not teach the start positions to the machine 100, but rather must only enter or select the pertinent identifiers for wheel rim 106 and tire 108 combinations so that the machine can locate the appropriate profile for use in a demount process.

Aside from selecting and starting desired tire change procedures, due to many variables encountered in executing the tire change procedures it is possible that conditions may be encountered that prevent completely automatic removal of a tire 108 from a wheel rim 106, or that prevent a complete mounting of a tire 108 onto a wheel rim 106. In these instances it is desirable to provide the human operator with some capability to intervene and interact with one or more components of the tire changing machine 100 so that the procedure can be completed. For example, the human operator may wish to stop an otherwise automated procedure so the tire 108 and wheel rim 106, or perhaps one of the machine tools 114, 116, 118 can be repositioned as needed or according to operator preference. Such operator preference may result the human operator's knowledge of an actual or potential problem or condition that has not yet been detected by the machine 100, or even a problem or condition that the machine 100 is not capable of detecting.

In an exemplary embodiment, rather than to provide a switch or button that is simply pressed and released to start a selected procedure, a "dead man" control input device or element 220 may be provided instead that requires continuous activation by the operator to execute the selected procedure. As long as the dead man control input device or element 220 is actuated, the selected automatic procedure is executed and will proceed through all of its steps to completion. The automatic procedure may be interrupted or stopped, however, at any time the dead man control input device or element 220 is released. The technician is therefore free to interact, or not, with the machine 100 as desired as automated procedures are being run by activating or releasing the dead man control input device or element 220. Interaction by the human operator may involve repositioning one or more of the machine tools 114, 116 and 118, rotating the drive assembly 104, repositioning the tire 108 and wheel rim 106, or other manipulation of machine components. This type of dead man control also advantageously provides a very quick and intuitive emergency stop or suspension, if necessary, of an automated procedure being performed by the machine 100.

In one contemplated embodiment, the dead man control element 220 may preferably correspond to one of the foot pedals 110*a*, 100*b* (FIG. 1) that is stepped on and held down by the human operator as the selected procedure is executed. The use of a foot pedal 110*a* or 110*b* is advantageous in that it leaves the operator's hands free for other uses and allows for a natural release if the operator chooses to quickly move out of the way. At any time the operator discontinues to hold the pedal down, operation of the selected procedure is suspended and the controller 202 enters a dwell period. During the dwell period the operator may manually manipulate the machine components using the other input selectors provided on the machine, and at any time may once again depress the foot pedal to resume automated execution of the selected procedure. Because the presence of the human operator is required to operate the dead man control element 220, it can be ensured that the machine 100 will not run apart from the presence of a person and a safer operating environment is provided.

Of course, other input selectors may be used as the dead man control input in lieu of the foot pedal as described. Various other input selectors including but not limited to those described elsewhere herein or in the related applications could alternatively be used as dead man control inputs with equal effect.

Various arrangements of the dead man control feature may be provided in different embodiments. In one embodiment, the dead man control input 220 provides a control signal to the controller when activated, and as long as the control signal is received the controller 202 will continue with automated operation of the selected procedure. In another embodiment the reverse could be true, namely that a control signal is provided only when the dead man control element 220 is released, and absent the presence of the signal the controller will continue with automated operation of the selected procedure. In still other embodiments, the dead man control element 220 could connect or disconnect electrical paths that enable or disable automatic operation of the machine. Still other arrangements are possible and may be utilized.

The benefits of the dead man control feature may be further enhanced when combined with an intuitive user interface such as that described below, wherein the dead man control element may be used to select different control options for both manual and automated operation of certain procedures.

B. Graphical User Interface for Automated Procedures

Presently available tire changer machines do not include a graphical user interface. Existing machines may include small digital interfaces for inputting or displaying wheel diameter or simple lines of text, but generally lack any capability to provide detailed informational feedback to the system operator.

The operator may use various input selectors and control devices to manually control the machine 100. Typical control devices include foot pedals, joysticks, knobs and switches. The input selectors are typically labeled and the technician decides which control to use to perform the desired task. As a tire changer becomes automated, however, it is more important for the technician to have access to information relating to specific processes being executed in case some change or interaction is required. A graphical user interface 222 is therefore provided to display such information to the technician.

In an exemplary embodiment, the GUI 222 may be a touch sensitive screen display or monitor. The screen or monitor may be a known electronic visual display that can detect the presence and location of a touch within a designated display area or areas. Various types of touch screens are known and may be used, including but not limited to resistive, capacitive and infrared touch detection. Of course, in other embodiments, the GUI 222 need not necessarily be touch sensitive, and input selectors such as a mouse or touchpad can be provided to make selections on the GUI 222.

The GUI 222 may present user interface displays and information screens to the operator, including but not limited to alerts graphically depicting upcoming critical operations or decision points so the operation of the machine is intuitive and the overall operating environment is improved. The user interface displays and screens may capably present voluminous amounts of data and details in easy to use, menu-driven form with intuitive links and graphical displays to quickly understand the machine selections, the current point of execution at each step in the procedure, and even provide step-by-step results and feedback to the operator as the machine 100 is used.

The user interface displays presented in the GUI 222 may be implemented conventionally in a computer program embodied on a computer readable medium and having segments of code or instructions executed by the controller processor 216, for example, that correspond to the various functions and features described.

The graphical user interface (GUI) 222 facilitates effective "training" of the operator or technician on the pre-programmed procedures executed by the machine 100 as each specific step of a tire changing procedure can be identified to the technician using the GUI 222. By watching the GUI 222, the operator can learn about how the selected procedures operate. Extensive training of the operator prior to operating the machine 100 is not necessarily required, as the operator can learn on the job what he or she needs to know.

Likewise, the operator or technician can "train" the machine via manual operation of certain steps that can then be stored in controller memory 218. The procedure steps can be recorded in various sequences and recalled (i.e. played back) in other sequences if desired. A plurality of pre-programmed steps and operator-defined steps and procedures can be stored and recalled by the controller 202 on demand.

Graphical screen displays using drawings, figures, diagrams and text may be displayed to the human operator via the GUI 222. For example, the screen displays may include animated drawings of certain portions of the machine illustrating the functions of the machine components at each step. During the automated procedure the display may be continuously updated to show the current location within the procedure being executed, machine components being used, and other information of interest. If the dead man control device 220 is released at any time in the procedure as described above the GUI may present the technician with context sensitive options to proceed that are specific to the current location in the automatic procedure in which operation was suspended by release of the dead man control element. That is, the information and options presented will be different depending on the timing of the release of the dead man control element 220 to suspend the procedure being executed, and exactly where in the procedure the suspension occurs.

Figure 3:
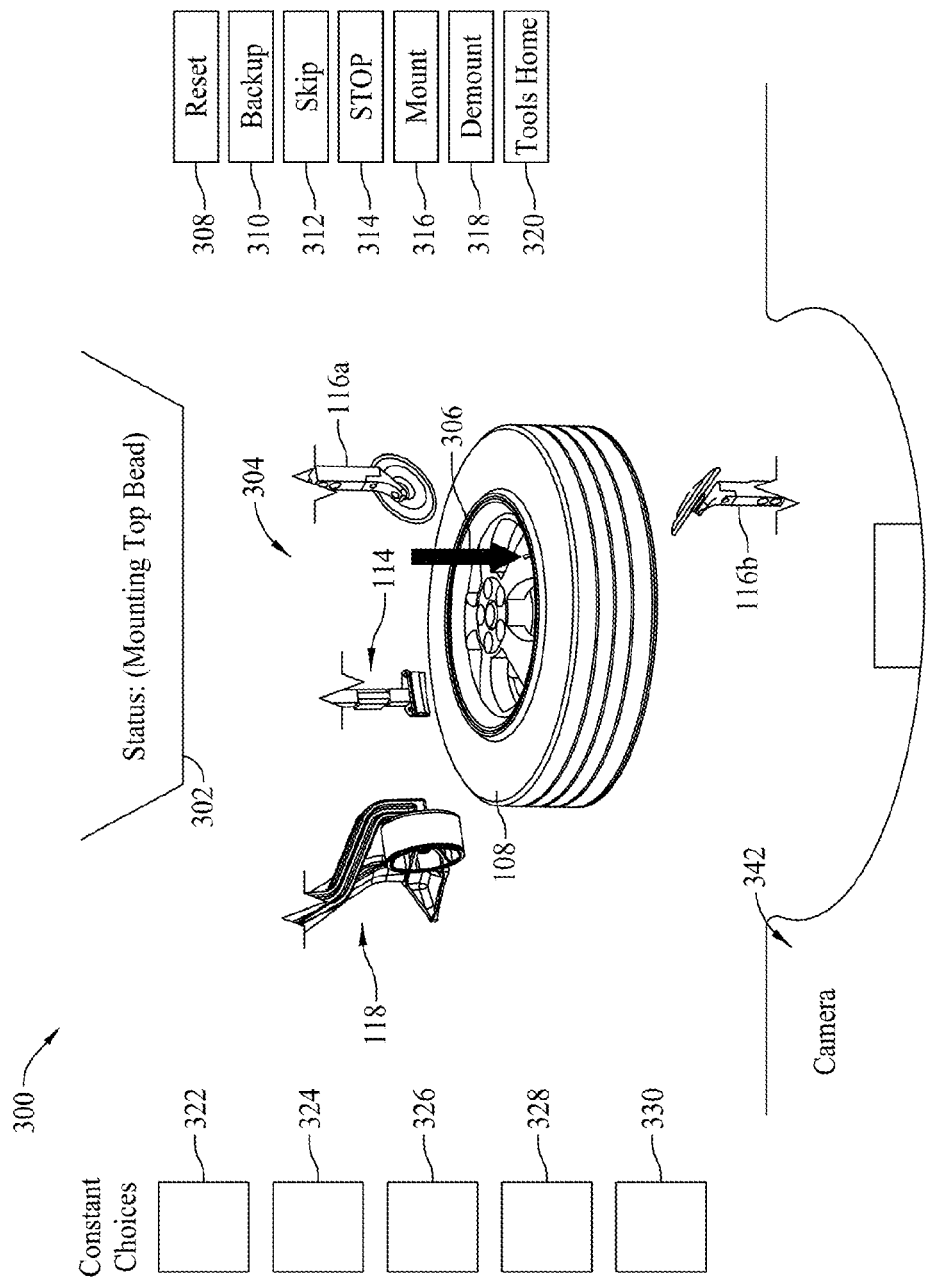
FIG. 3 is a first exemplary screen display for a user interface of the machine shown in FIG. 1 and the control system shown in FIG. 2.

FIG. 3 is a first exemplary screen display 300 that may be presented with the GUI 222. As shown in FIG. 3, the screen display 300 includes a status field 302 identifying to the user the current status of the machine 100. In the example of FIG. 3, the status provided is "Mounting Top Bead" and corresponds to one of the procedures made available on the machine for manual or automated execution by the machine 100.

A graphical section 304 is presented centrally on the screen display 300 and includes pictorial images or drawings of certain machine components (e.g., the machine tools 114, 116 and 118) in relation to the tire 108 as well as a reference point indicator 306 indicating a point of interest on the tire 108 such as a valve stem. The graphical section 304 may be animated so that one can see the images moving as the machine operation continues to execute the procedure.

Selection areas are provided to the left and right of the graphical section 304 on the exemplary screen 300. In the exemplary screen 300, on the right hand side are a reset selection area 308, a backup selection area 310, a skip selection area 312, a stop selection area 312, a mount selection area 314, a demount selection area 316 and a tools home selection area 320. These selection areas are believed to be self-explanatory. Depending on the status of the machine, not all of these selection areas may be present for selection. For example, when the first of the procedures in the mount or demount modes per the selection areas 316 and 318 are being executed, the backup selection feature 310 will not be presented. Likewise, required procedures cannot be skipped and the skip selection area 312 will not be presented, and the tools home area 320 will not be presented when the tools are already in a home position on the machine 100.

Figure 4:
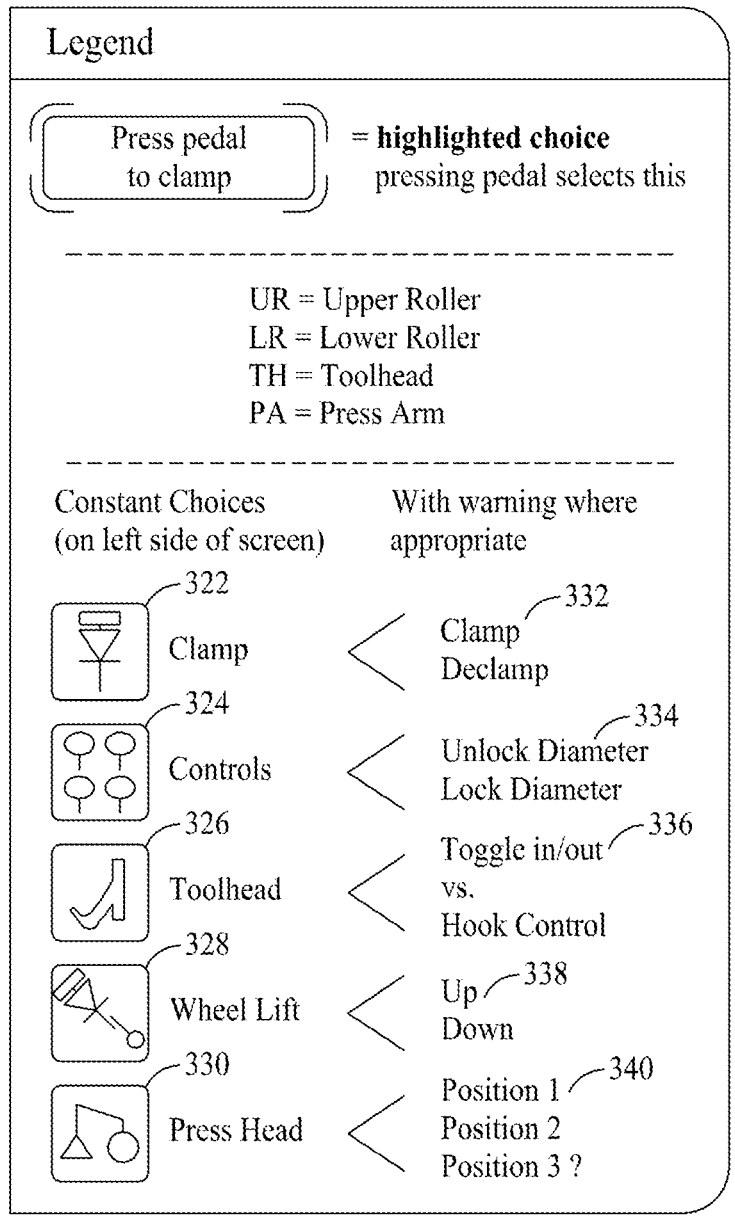
FIG. 4 illustrates exemplary selection options and a legend for the screen display shown in FIG. 3.

On the left hand side of the exemplary screen are a series of constant selection areas 322, 324, 326, 328 and 330 that are presented regardless of the status of the machine. As can be seen in FIG. 4, the areas 322, 324, 326, 328 and 330 respectively correspond to a clamp selection area, a controls selection area, a toolhead area, a wheel lift area, and a press head area. Each area is accompanied by warning fields as shown in FIG. 4 to indicate a state of each feature. The operator may select one of the areas 322, 324, 326, 328 and 330 and manually adjust the pertinent machine components.

Also, referring again to FIG. 3, a camera field 342 may be provided and display photographic pictures or video of the machine in operation as the selected procedure is executed.

Figure 5:
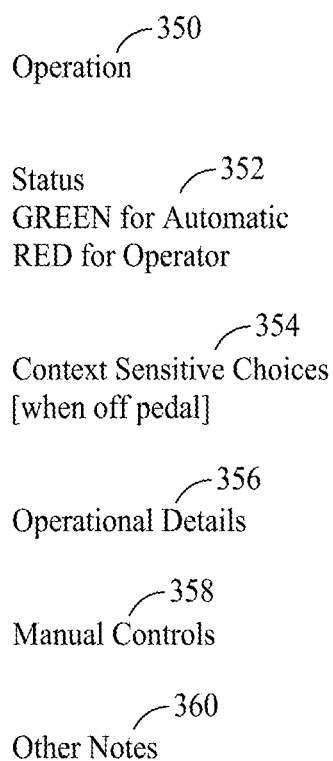
FIG. 5 illustrates an exemplary screen display and process layout template implementing further screen displays of the user interface.

FIGS. 4 and 5 illustrate exemplary selection options and a legend for interpreting the screen displays and processes shown in FIGS. 6-19. As shown in FIG. 4, highlighting is employed to indicate options that can be selected by activating the dead man control feature 220 described above, and when the dead man control element 220 is released, context sensitive alternative options are presented to the user as shown in FIGS. 6-19.

FIG. 5 illustrates an exemplary screen display and process layout template for FIGS. 6-19. As shown in FIG. 5, an operation field 350 is first presented, followed by a status field 352. A context sensitive choices field 354, an operational details field 356, a manual controls field 358, and a notes field 360 are also presented. Not all the fields shown in FIG. 5 need be presented to the operator, however, and further fields may be used. The field legends shown in FIG. 5 may be shown on screen with the information shown in FIGS. 6-19. The status field legend explains that automatic operation of the machine is indicated with the color red to indicate automated operation of the machine, and the color green indicates manual control of the machine. Thus, at a glance the machine operator can see whether the machine is operating in a manual mode or an automated mode.

FIGS. 6-19 illustrated a series of procedures and related processes and options implemented in the user interface. Specifically, FIGS. 6 through 14 illustrate various procedures each completing small task necessary to demount and remove the tire, and FIGS. 15-19 illustrate various procedures each completing small tasks necessary to mount a replacement tire to the wheel rim. Thus, FIGS. 6-19 illustrate a complete set of procedures to complete a tire change.

Figure 6:
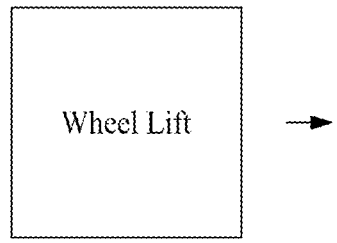
FIG. 6 illustrates an exemplary wheel lift procedure screen display and process implemented in the user interface.

FIG. 6 illustrates an exemplary wheel lift procedure screen display and process implemented in the user interface. The status is indicated as "press pedal to raise" in either green or red to indicate the manual or automatic mode of operation, and no context sensitive choice is presented in this procedure if the dead man control element (e.g., the pedal) is released prior to completion of the procedure.

Figure 7:
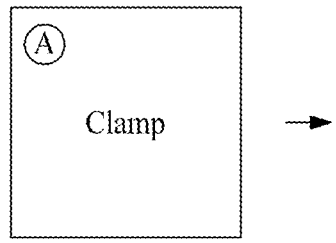
FIG. 7 illustrates an exemplary clamp procedure screen display and process implemented in the user interface.
Figure 7:
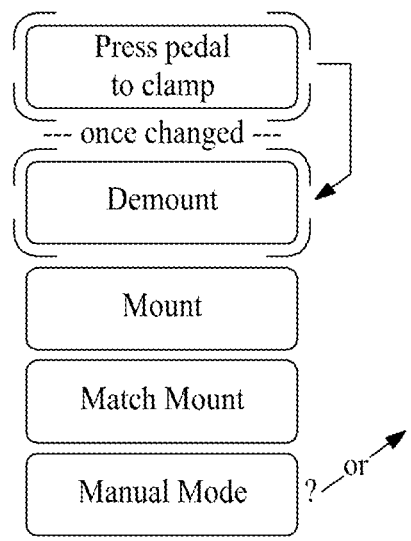

FIG. 7 illustrates an exemplary clamp procedure screen display and process implemented in the user interface. The status is indicated as "insert clamp" in either green or red to indicate the manual or automatic mode of operation. One context sensitive choice is initially displayed if the dead man control element is released prior to clamping being completed. Once clamping is completed, a context sensitive choice of "demount" is presented. Other context sensitive choices are also presented, including but not limited to a manual mode selection choice, if the operator releases the dead man control element at any time the procedure is underway, but not yet complete.

Figure 8:
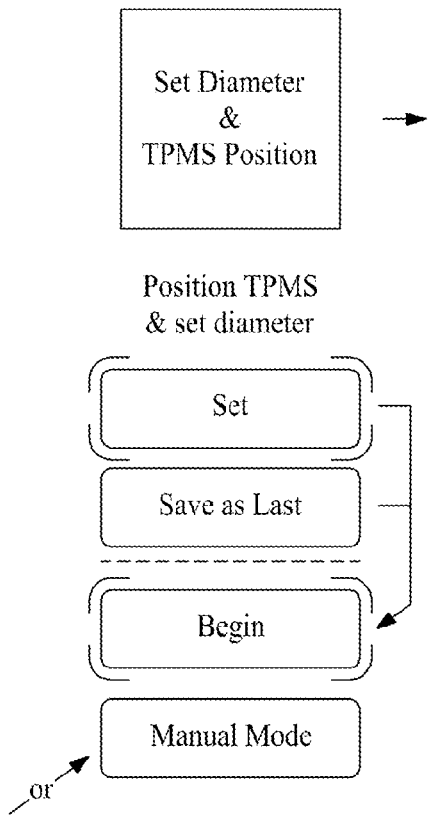
FIG. 8 illustrates an exemplary set diameter and TPMS position screen display and process implemented in the user interface.

FIG. 8 illustrates an exemplary set diameter and TPMS position screen display and process implemented in the user interface. The status is indicated as "position TPMS and set diameter" in either green or red to indicate the manual or automatic mode of operation. Initial and subsequent context sensitive choices of "set" and "begin" are presented along with a "save as last" choice and a "manual mode choice" if the operator releases the dead man control element prior to completion of the procedure.

Figure 9:
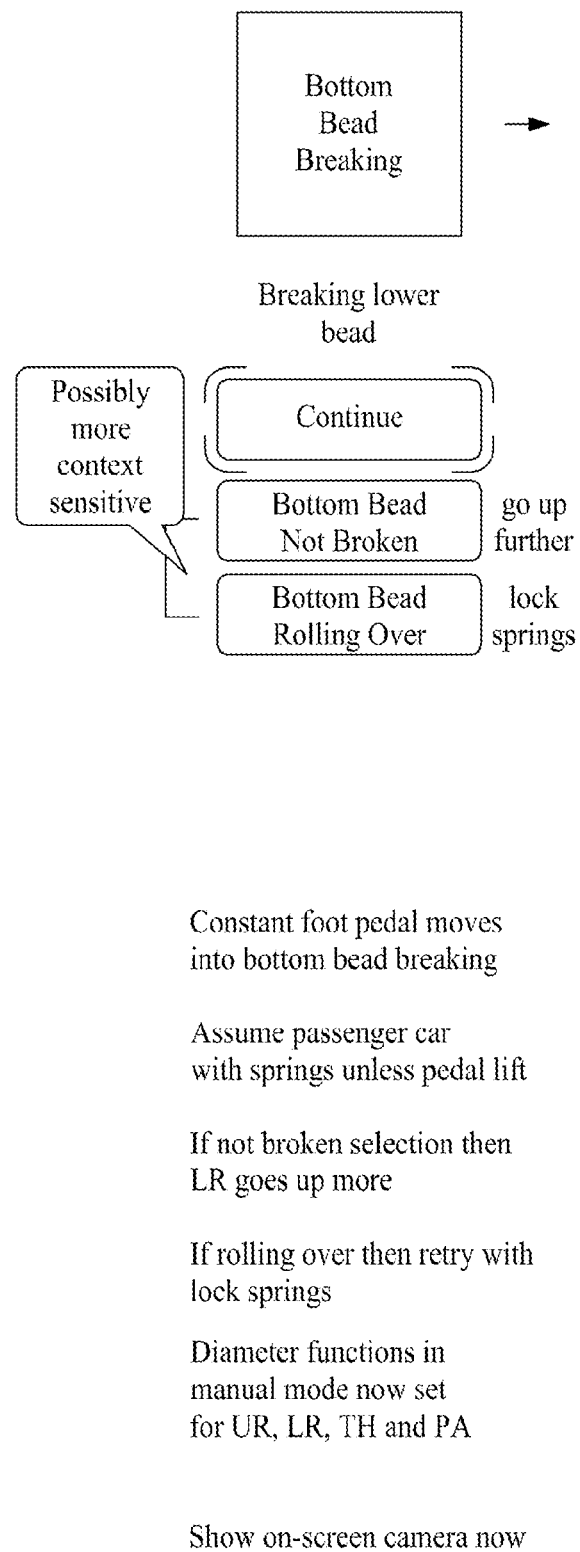
FIG. 9 illustrates an exemplary bottom bead breaking procedure screen display and process implemented in the user interface.
Figure 10:
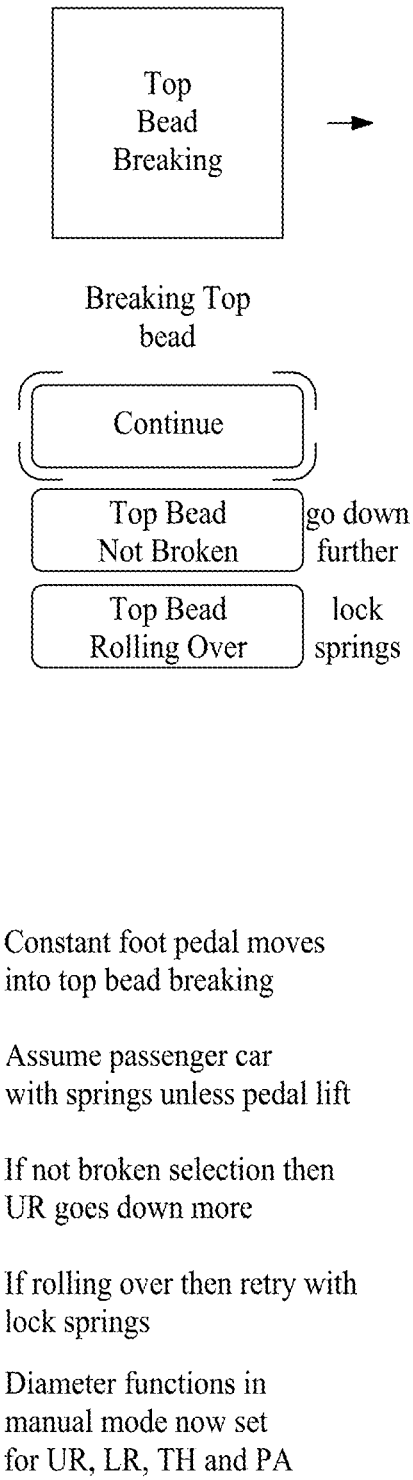
FIG. 10 illustrates an exemplary top bead breaking procedure screen display and process implemented in the user interface.
Figure 11:
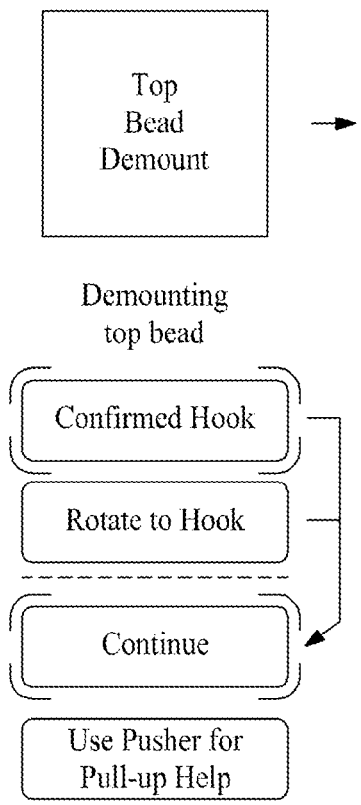
FIG. 11 illustrates an exemplary top bead demount procedure screen display and process implemented in the user interface.
Figure 12:
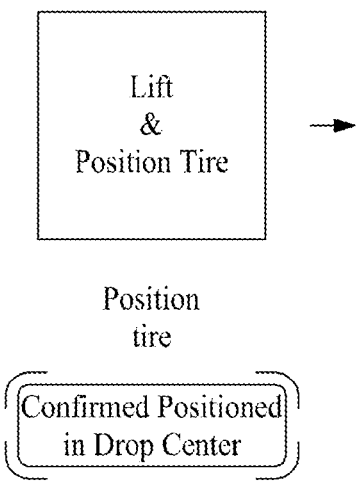
FIG. 12 illustrates an exemplary lift and position tire procedure screen display and process implemented in the user interface.
Figure 13:
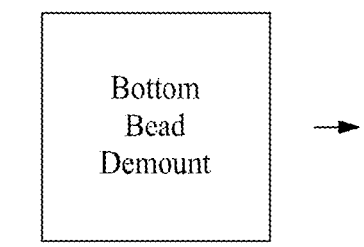
FIG. 13 illustrates an exemplary bottom bead demount procedure screen display and process implemented in the user interface.
Figure 14:
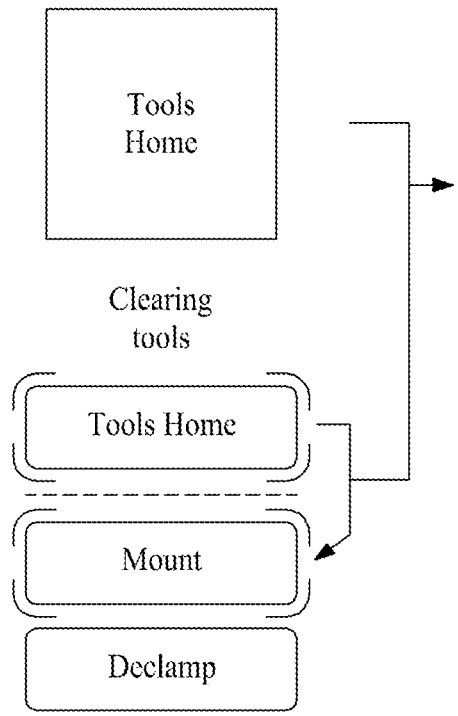
FIG. 14 illustrates an exemplary tools home procedure screen display and process implemented in the user interface.
Figure 15:
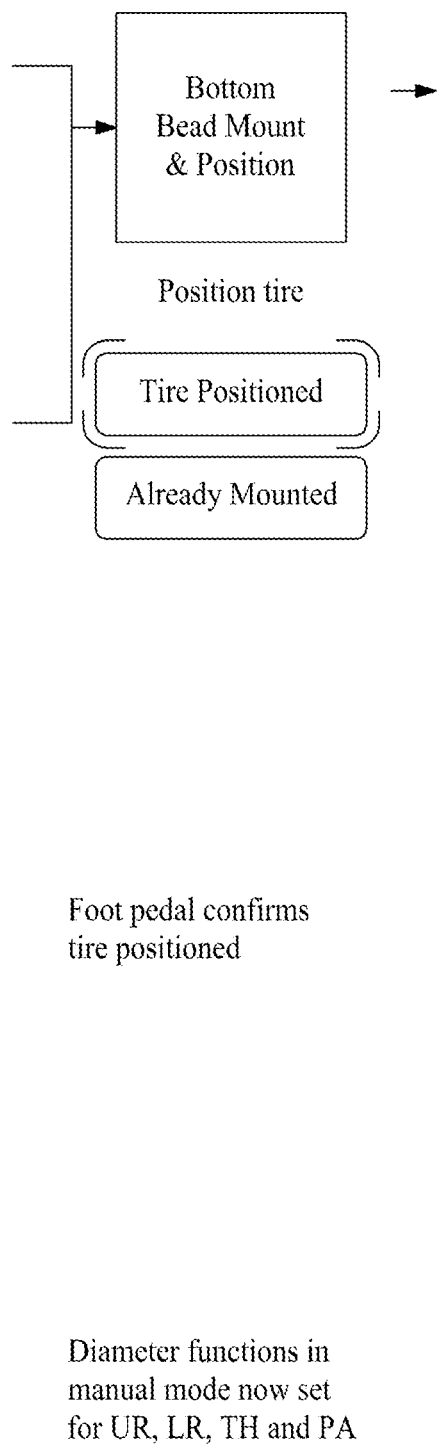
FIG. 15 illustrates an exemplary bottom bead mount and position procedure screen display and process implemented in the user interface.
Figure 16:
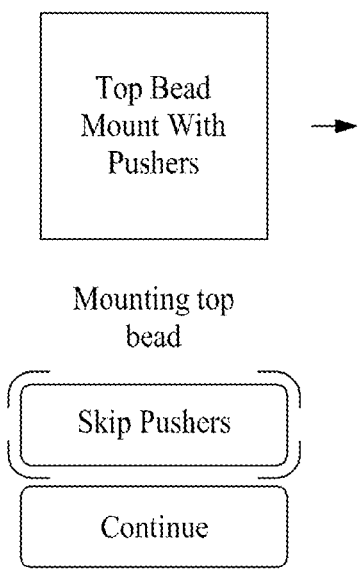
FIG. 16 illustrates an exemplary top bead mount with pushers procedure screen display and process implemented in the user interface.
Figure 17:
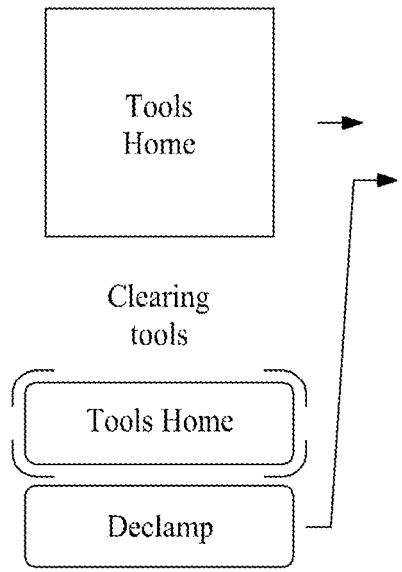
FIG. 17 illustrates an exemplary tools home procedure screen display and process implemented in the user interface.
Figure 18:
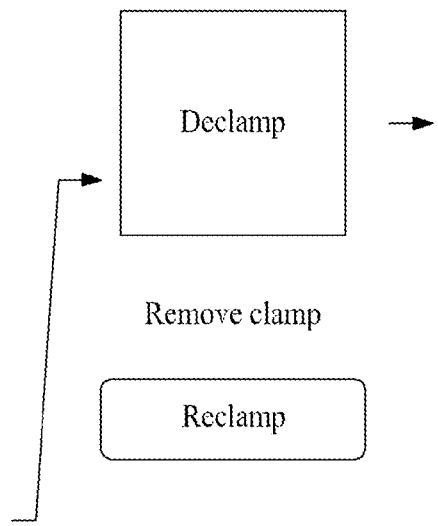
FIG. 18 illustrates an exemplary declamp procedure screen display and process implemented in the user interface.
Figure 19:
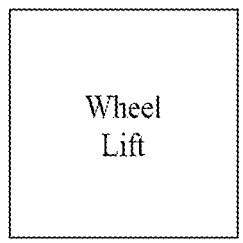
FIG. 19 illustrates an exemplary wheel lift procedure screen display and process implemented in the user interface.

FIG. 9 illustrates an exemplary bottom bead breaking procedure screen display and process implemented in the user interface. The status is indicated as "breaking lower bead" in either green or red to indicate the manual or automatic mode of operation. Context sensitive choices of "continue" and "bottom bead not broken" and "bottom bead rolling over" are presented if the operator releases the dead man control element before the procedure has completed.

FIGS. 10-19 respectively illustrate an exemplary top bead breaking procedure screen display and process, an exemplary top bead demount procedure screen display and process, an exemplary lift and position tire procedure screen display and process, an exemplary bottom bead demount procedure screen display and process implemented in the user interface, an exemplary tools home procedure screen display and process implemented in the user interface, an exemplary bottom bead mount and position procedure screen display and process implemented in the user interface, an exemplary top bead mount with pushers procedure screen display and process implemented in the user interface, an exemplary tools home procedure screen display and process implemented in the user interface, an exemplary declamp procedure screen display and process implemented in the user interface, and an exemplary wheel lift procedure screen display and process implemented in the user interface. Each of the screen displays except FIG. 19 includes one or more context sensitive options to be presented if the operator releases the dead man control element. It can be seen that the context sensitive options are different from one another and relate to the specific procedures being executed.

If the operator activates the dead man control element and does not release it, none of the screens or options shown in FIGS. 6-19 will be presented to the operator, and the controller 202 will execute the various procedures represented by FIGS. 6-19 in sequence in a completely automated manner. At any point that the dead man control element is released, context sensitive options are presented that correspond to the procedure being executed at the time that dead man control element is released. The context sensitive options displayed prompt the user for further action consistent with the procedure being performed at that time. As FIGS. 6-19 show, at times the operator is allowed to select a manual mode, while at other times only a prompt to continue the automated mode is presented. As is also evident from FIGS. 6-19, at certain times when the manual mode is selected a manual control of the machine components such as the machine tools is unrestricted in space, while at other times the manual mode only allows manual positioning of the machine tools within boundaries determined by previous completely procedures. That is, at certain times the manual controls are restricted to positioning the machine tools within a subset of the full range of movement made possible by the machine.

When any of the context sensitive options are selected, via touch or otherwise, they are highlighted so that the operator can see that they have been selected, and the machine operation continues in accordance with the selections made. The user can therefore switch between manual and automated modes of operation as desired. The screens shown in FIGS. 6-19 will only be displayed as needed, offering considerable variation in experiences of operators using the machine 100 to change a variety of tires. The operator may exert as much or as little control over the operation of the machine as desired or as needs dictate.

The operator, by activating and releasing the dead man control element, can accordingly complete a tire change procedure at his or her own pace, and has the ability to quickly suspend the automated operation of the machine at any time for any reason. The operator further has some ability by selecting the manual mode when available to make adaptations to accommodate wheel rims and tires, or to address difficulties that are not contemplated or overcome by the predefined procedures and control algorithms stored on the machine 100. The operator also has the ability to customize or optimize certain procedures according to user preference by teaching the machine new or adapted procedural steps and saving them for future recall. The machine is therefore highly adaptable to user preference and particular needs.

The procedures and processes shown in FIGS. 6-19 may also be accessed by selecting the choice areas 322, 324, 326, 328 and 330 shown in FIG. 4.

The exemplary screen displays shown and described are intuitive in nature and offer sufficient guidance for operators to take appropriate actions. The screen displays are, however, provided for the sake of illustration rather than limitation, and other intuitive and user friendly displays including other options, information and fields may likewise be provided with similar effect.

It is believed that those in the art may program the controller 202 or otherwise configure it to implement the user interface and processes reflected in the exemplary screen display without further explanation. It is recognized that not all of the process steps as shown and described to present options, information, and prompts to a user, as well as accepting prompts and operating the machine pursuant to selected options, are necessary to accomplish at least some of the benefits described. It is further recognized that the sequence of the steps as described are not necessarily limited to the particular order set forth, and that some of the functionality described can be achieved with other sequences of steps. Additional steps beyond those specifically described may be implemented in combination with the steps described.

Still further features are provided on the machine 100, however, to simplify its use and ensure that tire mounting procedures are properly and completely executed.

C. Improved Tire Bead Seating Features

Automatic tire bead seating provided on the machine 100 is used to improve the uniformity of the tire 108 and wheel rim 106 after a tire 108 has been mounted on the wheel rim 106. As part of the tire mounting procedure, the tire beads must be properly seated on the wheel rim. Seating the tire beads is necessary in order for the tire 108 to hold air and to force the tire beads over a safety hump that is commonly built in to many wheel rims 106. The interface between the tire bead and the wheel rim 106 actually has interference in the bead area so a large amount of force is typically required to seat the bead. Occasionally, however, the tire bead does not uniformly seat all the way around the wheel rim. If the tire bead is not uniformly seated, the effect on the vehicle is the same as a non-uniformity in the tire and undesirable vibration will occur if used on a vehicle.

To address such concerns, some technicians have been known to over-inflate the tire 108 after mounting with an unregulated air supply in order to ensure that the tire bead is fully seated for the entire circumference of the wheel rim 106. This is a dangerous practice and should be avoided. The machine 100 therefore implements another feature in the tire mount procedure to ensure that the tire bead is fully and properly seated on the wheel rim 106.

Toward this end, after mounting of the tire, the tire may be inflated with the valve core in place so that inflation pressure is maintained. Such inflation of the tire may be accomplished with inflation features in the machine, if provided, or separately provided at the site of the machine. The amount of inflation pressure can be nearly any amount from very low up to the full normal inflation capacity of the tire. Once the tire is inflated, the machine tools 116 or 118, or still other roller devices, can be brought into contact with the sidewall of the tire 108 close to the edge of the wheel rim 106. A force may be applied to the tire sidewall to slightly deflect the sidewall, but not enough to break the tire bead loose from the wheel rim. The wheel rim 106 may then be rotated for several revolutions of the drive assembly 104 as the force is applied to the tire sidewall. Such massaging of the sidewall under pressure safely ensures that the tire bead is in the proper position relative to the wheel bead seat of the wheel rim 106. This procedure can be automated near the end of a tire mount procedure.

D. Tire and Wheel Rim Information for the Operator's Benefit

As yet another feature, a barcode scanner or other reader element associated with the machine 100 can be used to identify vehicle, tire and/or wheel information and recall additional data from a database. This additional data may be related to tire size, wheel size, TPMS location, TPMS reset procedures, tire inflation pressure, preferred mounting adaptors, lug torque, and other items. Such information may be displayed on the GUI 222 for the use and benefit of the operator. The technician need not know or look-up such information from other sources.

E. Coordinated Tool Positioning

The controller 202 may move one or more components of the tire changing machine based on movement of another one of the other components. Because the control system 200 senses tool positions, knowledge of a start position for one tool, for example, can be used to automatically determine appropriate starting positions for other tools used in a procedure. Further, machine components can be moved simultaneously or independently by the controller 202. This has the advantage of allowing components to be automatically positioned to "ready positions" so when each component needs to contact the tire/wheel assembly it can do so with minimal additional movement required, thus saving valuable time for the operator. Such coordinated positioning is perhaps especially useful for manual positioning or adjustment of tool positions by the machine operator, but is beneficial for automated procedures as well as time savings can be realized with pre-positioning of the tools in the proper places for quick action when needed.

F. Auto Lubrication Features

It is common to apply a lubricant to the tire bead to reduce friction between the tire and the wheel rim during tire mounting and demounting processes. Conventional lubricants are typically in a paste or liquid form and are applied by a human operator using a brush. Since the lubricant is always applied at the interface of the tire bead and the wheel it is possible to affix an applicator 224 or dispenser to the bead breaker rollers 116 or other components in the machine. Lubricant can accordingly be automatically dispensed from the applicator 224 at the desired time during the procedure, and the operator therefore has one less thing to think about when operating the machine.

G. Further Context Sensitive Screen Displays for the User Interface.

Figure 20:
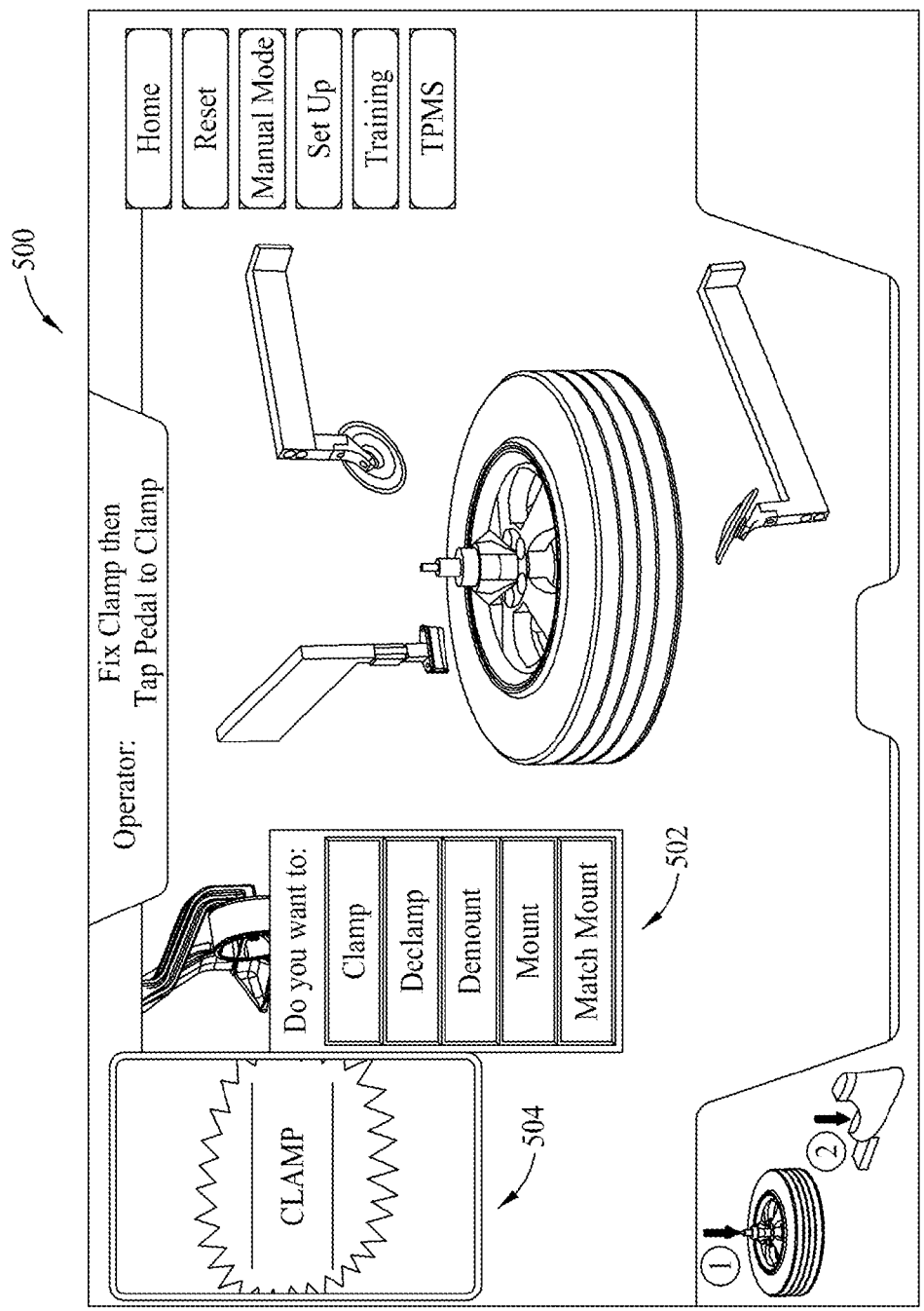
FIG. 20 illustrates a first exemplary context sensitive tire change procedure screen display that may be implemented in the user interface of the machine shown in FIG. 1 and the control system shown in FIG. 2.
Figure 21:
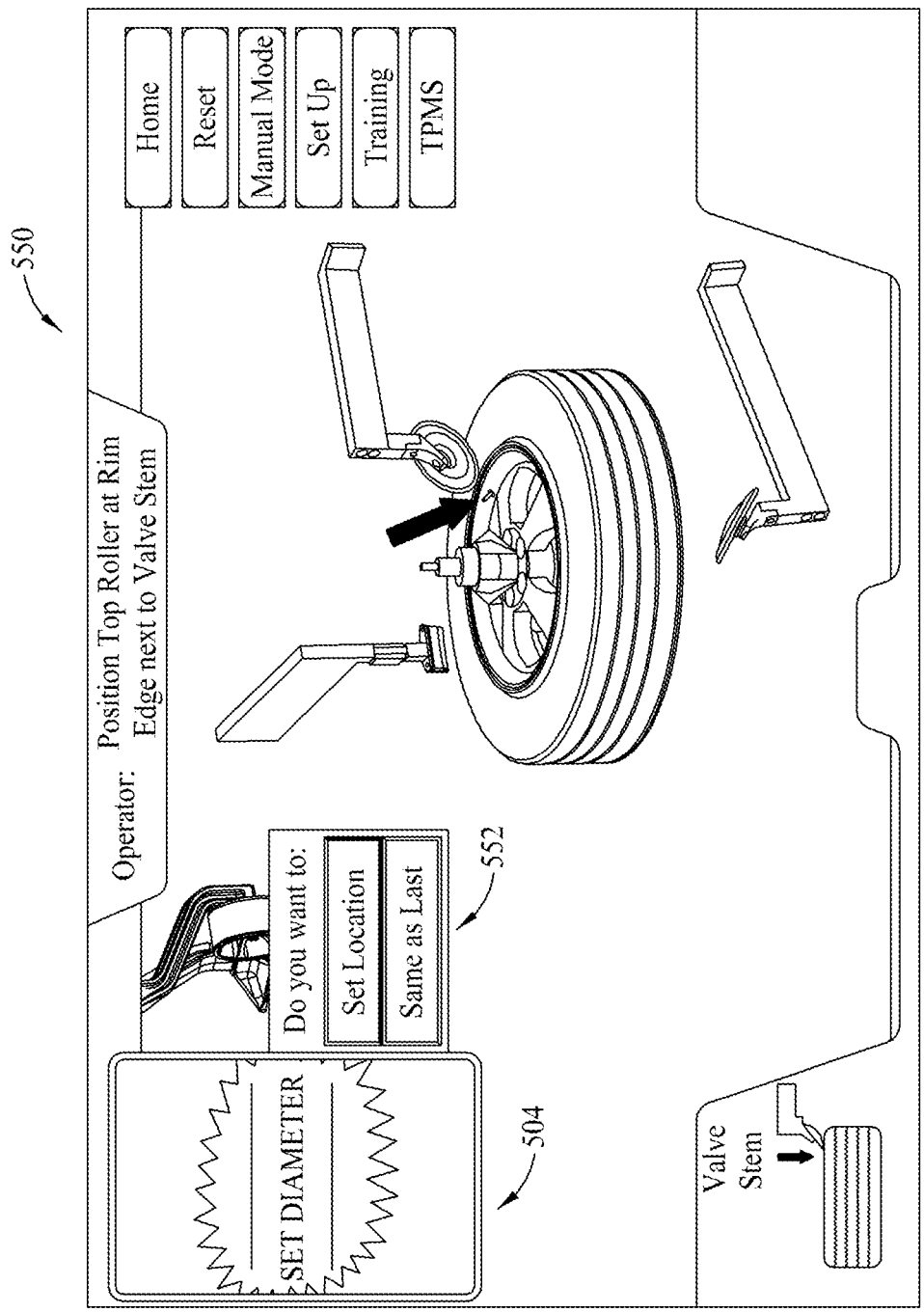
FIG. 21 illustrates a second exemplary context sensitive tire change procedure screen display that may be implemented in the user interface.
Figure 22:
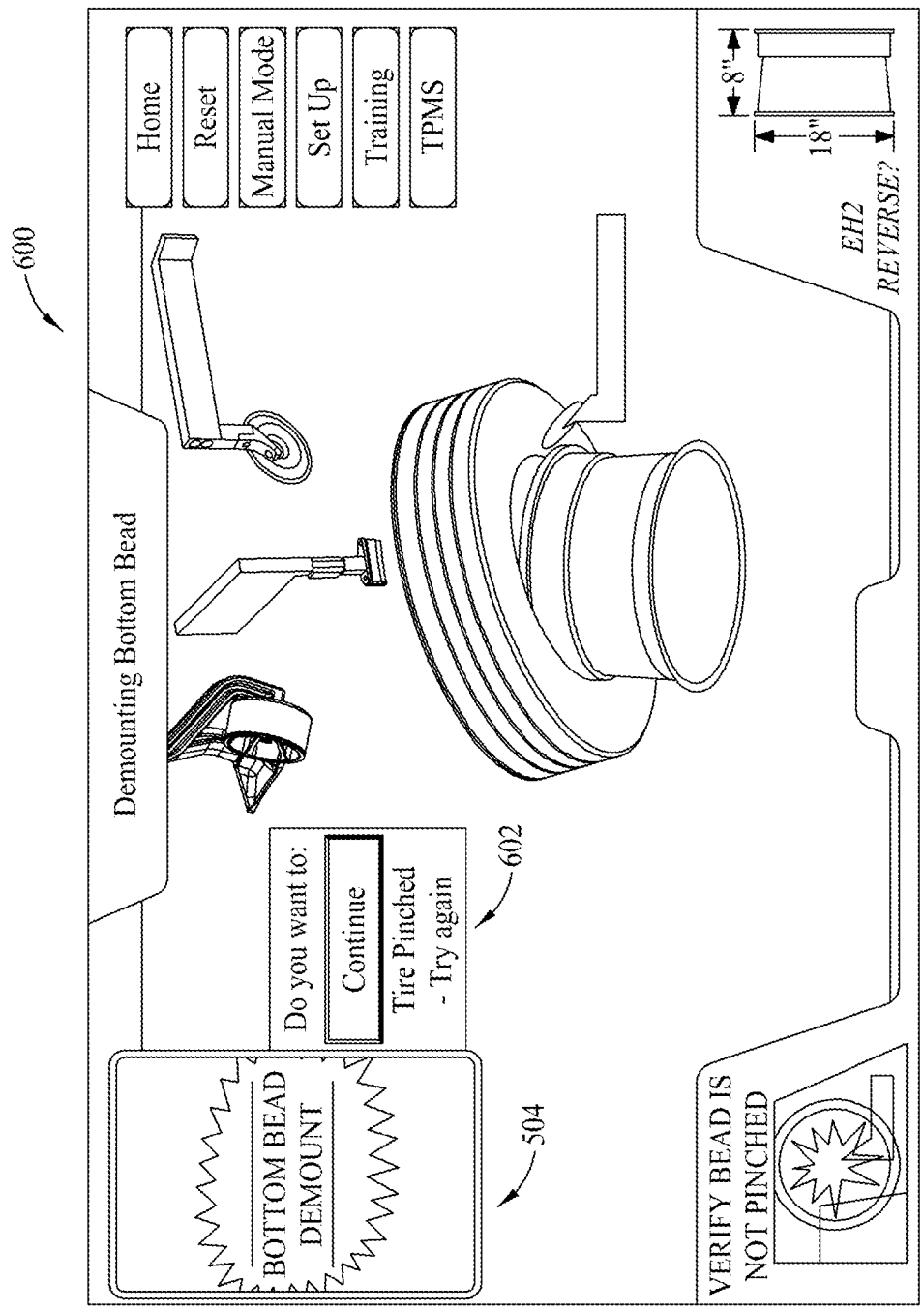
FIG. 22 illustrates a third exemplary context sensitive tire change procedure screen display that may be implemented in the user interface.

FIGS. 20-22 illustrate additional screen displays that may be implemented in the user interface 222 and the control system 200 (FIG. 2) to advantageously operate the tire machine 100 (FIG. 1).

Conventional automotive tire changing is accomplished using a tire changer machine that operates like a simple tool. The conventional tire changer machine is controlled completely by the operator. Each step and operation in a tire change procedure is accordingly controlled, started, ended, performed or skipped completely at the operator's discretion and skill when operating the machine.

There is generally an established procedure for most tire changing operations, but because of the widely varying number of tire and wheel rim combinations, there are elements of the processes performed to successfully complete a tire change procedure that preferably need adjustment at certain points in a procedure or when the procedure is performed on certain types of tires. Often, such adjustment or deviation from "normal" procedures and steps cannot be reliably anticipated before the tire changing operation is begun. Thus, any attempt to standardize a step-by-step procedure in an automated machine is likely to be problematic for certain wheel rim and tire combinations. In conventional machines, operator skill will largely determine whether or not a particular procedure can be successfully completed, or how efficiently it may be completed. Unskilled operators of conventional machines may have to resort to a trial and error process in order to complete certain procedures involving certain types of tires, with an increased potential to damage the tire, the wheel rim, or machine components as they experiment with the machine components in different ways to mount or de-demount particular tires.

FIGS. 20-22 illustrate aspects of screen displays associated with dynamic tire change procedures that allow the necessary flexibility to successfully complete the tire change procedures, while still providing a large degree of automation. That is, the graphic user interface 222 and screen displays such as those shown in FIGS. 20-22 can dynamically change on demand or as needed during the tire changing process as abnormalities or deviations from "normal" or standard procedures become necessary or appropriate to complete a procedure.

In contemplated embodiments, regardless of which tire and wheel rim type is being used on the machine 100, each tire changer operation will start with one normal or "standard" procedure. The normal or standard procedure may start when the machine operator manipulates an input selector such as the "dead man" control element 220 (FIG. 2), which may be, for example, a foot pedal provided on the machine 100. So long as the operator continues to stand on a "dead man" control element 220 (a foot pedal in this example) the normal or standard procedure tire changer procedure will be performed by the controller 202 using the various feedback signals described above.

Should some abnormality become evident to the operator (i.e., a need for some deviation in the standard procedure is desirable or necessary), or if an aspect of the procedure being performed is not successful, the operator may lift his or her foot off the "dead man" pedal 220. When the dead man control element 220 is released and the feedback signal therefrom is no longer present, the controller 202 may operate the interface 222 and present specific choices to the operator as illustrated in the screen displays 500, 550, and 600 of FIGS. 20-22, respectively.

In contemplated embodiments, the choices provided in the screen displays 500, 550 and 600 are context sensitive for the particular point at which the dead man control element 220 was released. In other words, the only choices presented that are valid for the steps of processes/procedures being performed at the time of release of the dead man control element 220 will be presented via the screens 500, 550, 600 and the GUI 222. Additionally, the most logical (or statistically likely) choice will be preselected in the exemplary menus 500, 550, 600 and the operator will only need to press the "dead man" pedal 220 again and the process will resume with the pre-selected operation inserted. The process/procedure performed will then seamlessly flow back into the normal standard procedure with no further operator intervention as long as the operator continues to hold down the dead man control pedal 220.

Such processes involving context-sensitive options and displays are sometimes referred to as "branching". Anytime the "dead man" pedal 220 is not pressed, appropriate "branching" choices will be provided via the screen displays 500, 550, 600 and the user interface 222. In each case, the "branching" choices will be limited to the logical, likely, and safe choices that can be made at that time that the dead man control element 220 was released by the operator. If the dead man control element 220 is not released, only the standard steps will be completed. Depending on precisely when the operator releases the dead man control element 220, however, different possible options will be presented, and pre-selected as desirable for the operator's use and benefit. Even unskilled operators may therefore successfully complete "abnormal" tire change procedures by following the options presented, which will displayed only when needed at particular portions of the procedure when the operator releases the dead man control element 220. That is, the machine controller 202, via the GUI 222 and the displays 500, 550, 600 can provide some intelligence and guidance to operators to complete difficult procedures, and successful completion of abnormal procedures is therefore much less dependent on operator skill and experience to make the appropriate modifications at the appropriate times from a "normal" or easily accomplished procedure.

Successful implementation of such a "branching" strategy for presenting appropriate context sensitive options to a machine operator is advantageous in several aspects.

Firstly, when pre-selected options are included, the operator need not determine himself or herself what the appropriate action should be (or even what the appropriate options are), but may merely follow the recommended, pre-selected choice presented.

Secondly, the operator is not abandoned in the middle of a procedure should a tire not mount or demount as expected. Rather, options to proceed are provided for the use and benefit of the operator to continue abnormal or difficult procedures.

Thirdly, certain time consuming aspects of a procedure can be abbreviated for many tire/wheel rim combinations by using the "branching" strategy. That is, steps that are likely to be problematic or unlikely to benefit the particular procedure being performed can simply be omitted or skipped.

Fourthly, certain steps can receive extra attention or a "second try" using the branching system as needed or as desired. Thus, difficult steps can be repeated until successful, without the operator having to start over at the beginning of the procedure.

Support for "Branching" will be tightly integrated into the control system hardware and/or software. When the human operator lifts the "dead man" pedal 220, the hardware/software will clearly describe the choices that the operator can make and the operator will be able to quickly make the choice with a graphical user interface 222 that in some embodiments may utilize touch screen technology. The choice that the technician made will be clearly shown by the graphical representation of the tire changer that is part of the user interface.

For example, in the screen display 500, the dead man control element 220 has been released during the clamping portion or procedure, and a context sensitive option menu 502 is provided including the operator prompt "Do you want to:" and a list of options including "Clamp", "Declamp", "Demount", "Mount" and "Match Mount". In the screen display 550, the dead man control element 220 has been released during the "set diameter" portion or procedure, and a context sensitive option menu 552 is provided including the operator prompt "Do you want to:" and a list of options including "Set Location" and "Same as Last". In the screen display 600, the dead man control element 220 has been released during the Bottom Bead Demount, and a context sensitive option menu 602 is provided including the operator prompt "Do you want to:" and a list of options including "Continue" and "Tire Pinched—Try Again". The option menus 502, 552 and 602 represent exemplary "branches" in the type of system described. Of course, other branches may be provided in lieu of or in addition to the examples shown in FIGS. 20-22.

Also shown in the displays 500, 550, 600 of FIGS. 20-22 is an additional interface element sometimes referred to as a procedure wheel 504. The procedure wheel 504 allows an operator to "jump" from a given procedure to a completely different procedure. The operator may turn the wheel and select another procedure by selecting one of the other options visible on the wheel. The present procedure is highlighted in the examples shown so that the operator may see which procedure is being performed. Thus, in the screen display 500, the procedure wheel 504 shows "Clamp", in the screen display 550, the procedure wheel 504 shows "Set Diameter" and in the screen display 600 the procedure wheel 504 shows "Bottom Bead Demount".

This type of "jumping" is advantageous because there are occasions where an operator needs to only do one operation to a tire/wheel rim mounted on the machine 200. A fixed, or pre-set order of procedures, if provided, would in such circumstances not lend itself to an efficient selection of only the exact step desired. Using the procedure wheel/"jumping" feature 504 (or perhaps another interface element serving a similar purpose) an operator can more directly navigate to the desired step they wish to perform, without having to navigate through other steps first.

In contemplated embodiments, another unique element of the procedure wheel 504 is that the procedure would continue from the "jumped" position as if the operator had never "jumped" at all. An example of when such jumping might be used includes, but is not limited to, a situation where a tire is mounted to wheel rim and needs removal but the tire beads are not set. In this case the operator could clamp the wheel rim in place, and then "jump" directly to the demount operation and bypass a bead breaking procedure altogether as it is not needed in this situation. Thus, "jumping" made possible by the procedure wheel 504 affords much flexibility and efficiency to quickly meet exact needs.

The jumping and branching strategies described, in combination, define navigation capabilities and ease of use in operating the machine that is believed to be unparalleled in the tire changer industry.

In contemplated embodiments, support for "Jumping" as described is implemented in the tire changer software with a graphical representation of the procedure known as the "procedure wheel" 504 described above. As a human operator or technician progresses through the procedure he/she will be able to clearly see from the procedure wheel 504 where they are in the procedure, what steps came before and what steps are about to be performed. This user interface will provide a touch screen interface, represented by the displays 500, 550 and 600 in which the technician can choose to jump forward and backward in the procedure. The user interface will only allow the user to jump, however, to steps that are reasonable and safe. When the user jumps within the procedure, the change in the procedure will be clearly shown by the graphical representation of the tire changer that is part of the user interface.

Figure 23:
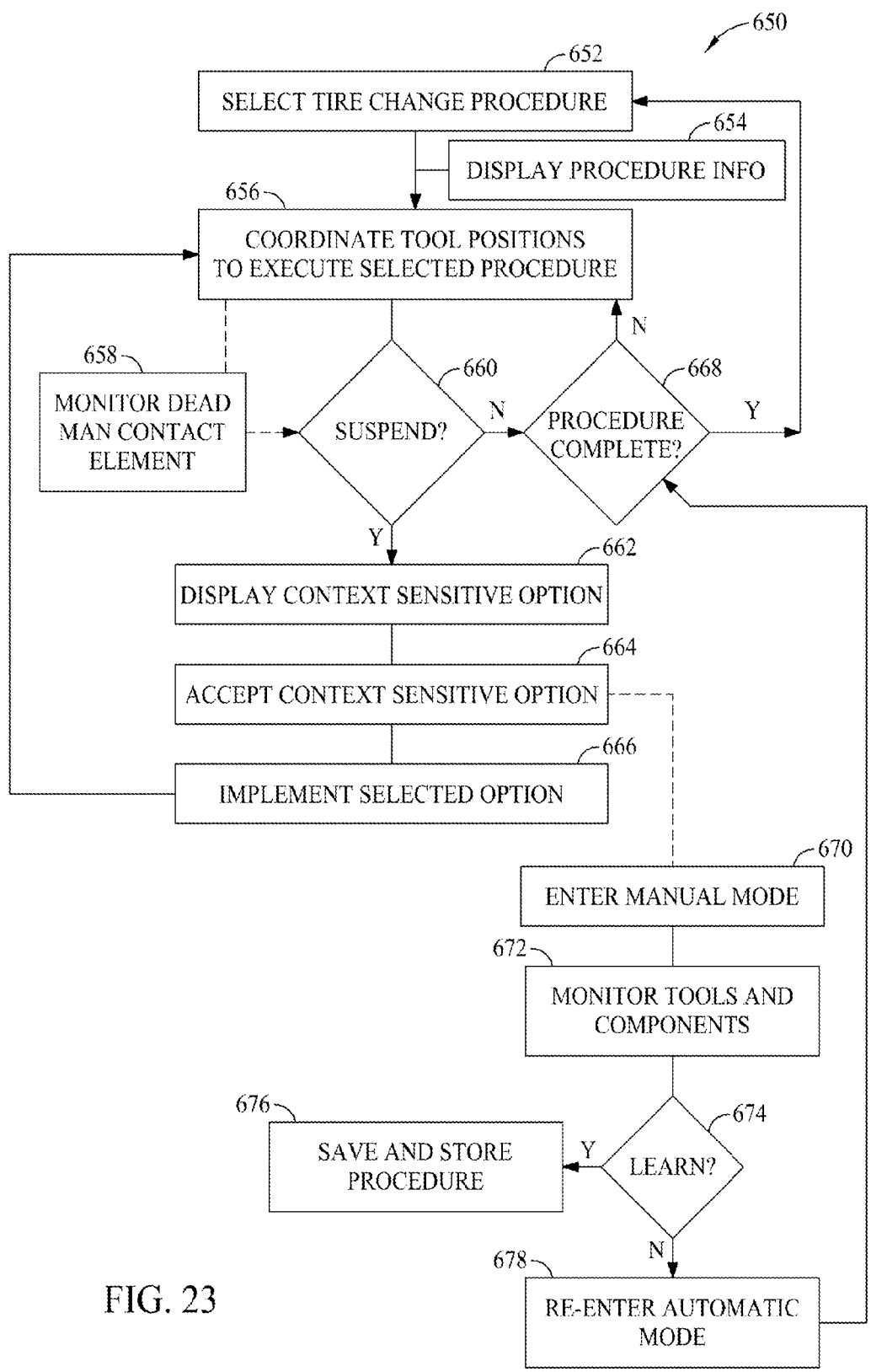
FIG. 23 is a flow chart of an exemplary algorithm for executing a tire change procedure utilizing the exemplary machine shown in FIG. 1, and the control system of FIG. 2.

FIG. 23 is a flow chart of an exemplary algorithm 650 for executing a tire change procedure utilizing the exemplary machine 100 (FIG. 1), and the control system 200 (FIG. 2). The algorithm 650 shows one example of how the concepts described above may be implemented in method or process steps to accomplish the functionality described above. Other algorithms are possible and may be used to implement similar functionality with similar results, and the algorithm 650 is therefore provided for the sake of illustration rather than limitation.

The algorithm 650 as shown assumes that a wheel rim is mounted and properly clamped to the machine so that a tire can be mounted to or demounted from the wheel rim as described above. Thus, preliminary steps of mounting the wheel rim and tire are not shown, but are of course required to successfully complete a tire change procedure. Once this is accomplished, a tire change procedure is selected as shown at step 652. Any of the procedures discussed above or in the related applications may be made available for selection, and the selection may be made in an automated manner or a manual manner as discussed above. The selection may also involve a "jumping strategy" as discussed above, wherein the user may directly select a specific procedure for execution. The selection may be made through the GUI 222 or other input selectors in various embodiments.

As shown at step 654, information relating to the selected procedure may be displayed for the operator's benefit to understand what actions are taken by the machine to execute the procedure, which machine components are involved, and other information as discussed above. This information beneficially educates the human operator of the machine regarding how the machine operates, and provides some ability for the user to oversee actions taken by the machine, and if necessary to intervene and manually adjust otherwise automated operation of the machine in the manner described above. The information displayed at step 654 may include any of the exemplary displays discussed above. The displays may include animation, photos, or video information as described, as well as the various information and fields shown in the exemplary displays described above. It is recognized, however, that other displays are possible to achieve similar results.

As shown at step 656, the machine, and specifically the controller 202 as informed by the sensors in the control system 200 (FIG. 2) coordinates the tool positions in an automated manner to complete one or more steps of the selected tire change procedure. As such, the machine automatically undertakes control of the tools to complete the selected procedure without specific direction or input from the human operator to move the components implicated in the execution of the tire change procedure selected and being executed.

In embodiments wherein the dead man control element 220 (FIG. 2) is provided, the controller 202 monitors its position or status as shown at step 658. When the dead man control element 202 is activated or released depending on how it is implemented, a control signal is provided that is recognized by the controller and causes automatic suspension of the automated tool position as directed by the human operator. Thus, as shown at step 660, by monitoring the presence or absence of the signal from the dead man control element, the controller can determine if the human operator has called for automated operation of the machine to be suspended. As shown in FIG. 23, the dead man control element in some embodiments may be considered optional and the controller can evaluate whether suspension is required at step 660 by other means.

If at step 660, suspension has been demanded by the operator, the context sensitive information described above is presented or displayed as shown at step 662 and the controller awaits for the operator to select from the context sensitive information how the operator would like to proceed. The options presented may include any of the options discussed above using any of the algorithms or strategies disclosed, and the selection may me made by the operator in any manner described above or otherwise known in the art. When the operator selection is made, the controller accepts the selection as shown at step 664. Once the operator selection has been accepted, the controller proceeds to implement the accepted selection as shown at step 666 and thereafter return to automated coordination of the machine tools at step 656. As such, the operator may make necessary adjustments, deviations, or re-try unsuccessful steps in an otherwise standard automated procedure as described above.

As should be evident from FIG. 23, the machine may cycle through as many suspension events as the operator desires. When no suspension is required, the controller determines if the procedure has been completed as shown at step 668. If the procedure is not complete, the controller continues to coordinate the tools at step 656 to advance the completion of the procedure selected. If the procedure has been completed, the controller returns to step 652 where another procedure can be accepted.

As also shown in FIG. 23, the machine may optionally be operable in a manual mode when desired as shown at step 670. The manual mode may be entered through the context sensitive option display from step 662 if the operator desires, or may alternatively be entered by other means including the selection shown at step 652 or elsewhere as the machine operates. In the manual mode, the automated coordination of the machine tools and components is disabled and the operator resumes full control over all operational aspects of the machine. As shown at step 672, the controller when in the manual mode may monitor the tool positions and actuation of components as undertaken by the operator using the feedback sensors shown in FIG. 2. If desired, the controller may learn any steps completed by the operator in the manual mode as shown at step 674. The learn option may be prompted when the operator enters the manual mode in an appropriate screen display.

If the user desires the learn option, the controller saves and stores the manually completed aspects of the procedure as shown at step 676. Once stored, the learned procedure may be retrieved by the operator for future recall and use via an appropriate option in one of the screen displays. Learned procedures may be presented as context sensitive options at step 662, may be made available from the procedures selectable at step 652, or may be presented at any other desirable point for the use and benefit of the operator.

If at step 674 the learn option is not desired, the controller may re-enter the automatic mode as shown at step 678. The controller may then return to step 668 and determine if the procedure is complete or otherwise return to step 652 for selection of another procedure. Using the manual mode feature at step 670, the machine operator may exercise as much control as desired to complete tire change procedures on difficult wheel rim and tire combinations, and save the results for later use.

The flexibility of the machine is believed to be demonstrated in FIG. 23, where it should now be evident that in some cases the machine will successfully complete tire change procedures with little or no input by operators, in other cases the machine will coordinate and complete most of the aspects needed to complete the tire with limited assistance from the human operator to make necessary adjustments, or in other cases may completely rely on manual control by the operator to complete certain procedures. Thus, skilled operators may exercise complete control if necessary or desired, while lesser skilled operators may rely wholly or predominately on the automated aspects of the machine. Lesser skilled operators may become more skilled by interacting with the machine and its information displays so that the machine may teach the operator how to successfully complete tire change procedures, while the machine may also learn from the operators additional options and procedures that are not pre-programmed into the machine.

Having now described the algorithm 650 it is believed that those in the art may program the controller 202 or otherwise configure it to implement the user interfaces and processes reflected in FIG. 23 and the associated exemplary screen displays without further explanation. It is recognized that not all of the process steps as shown and described in FIG. 23 are necessary to accomplish at least some of the benefits described. It is further recognized that the sequence of the steps as described are not necessarily limited to the particular order set forth, and that some of the functionality described can be achieved with other sequences of steps. Additional steps beyond those specifically described may be implemented in combination with the steps described.

III. Conclusion

The benefits and advantages of the invention are believed to be amply demonstrated by the exemplary embodiments disclosed.

An embodiment of a tire changer machine has been disclosed including: a clamping assembly configured to receive a wheel rim; a drive assembly configured to rotate the wheel rim about an axis; a plurality of tools selectively positionable to mount a tire on the wheel rim and demount a tire from the wheel rim; a control system configured to coordinate the plurality of tools to complete a tire change procedure in an automated manner; and a dead man control input element configured to be selectively operable by a human operator in respective activated and released states, wherein the control system coordinates the tools in an automated manner to execute a tire change procedure when the dead man control input element is in one of the activated and released states, and wherein automated coordination of the tools is suspended when the dead man control input element is in the other of the activated and released states.

Optionally, the dead man control input element comprises a foot pedal. The machine may also include a graphical user interface configured to present information to the operator concerning the tire change procedure. The control system may be configured to execute a plurality of different tire change procedures and the user interface may be configured to display at least one context sensitive option when automated coordination of the tools is suspended, with the at least one context sensitive option being different depending on the respective one of the plurality of different procedures being executed at the time that automated coordination of the tools is suspended.

An embodiment of a tire changer machine has also been disclosed including: a clamping assembly configured to receive a wheel rim; a drive assembly configured to rotate the wheel rim about an axis; a plurality of tools selectively positionable to mount a tire on the wheel rim and demount a tire from the wheel rim; a control system configured to coordinate the plurality of tools to complete a tire change procedure in an automated manner; and a user interface configured to display context sensitive information to a human operator regarding execution of the tire change procedure.

Optionally, the context sensitive information may comprise at least one context sensitive option manually selectable by a machine operator. The at least one context sensitive option may include a pre-selected option for acceptance by the human operator. The machine may be operable to coordinate the tools in an automated standard procedure until automated coordination of the machine tools is suspended at the direction of the human operator, and when the at least one context sensitive option is selected by the human operator, the machine may insert the selected option and thereafter continue the standard procedure until automated coordination of the machine tools is again suspended. The machine may also include a screen display visually presentable to the operator via the graphical user interface, with the screen display including at least one of an animation to show the tire change procedure being completed and a field for the display of a photographic picture or video of the tire change procedure being completed. The control system may also be configured to learn a user defined aspect of a tire change procedure, and store the user defined aspect for future recall.

A method of changing a tire on a wheel rim has also been disclosed. The method is implemented with a tire changer machine including a clamping assembly configured to receive a wheel rim, a drive assembly configured to rotate the wheel rim about an axis, a plurality of tools selectively positionable to mount a tire on the wheel rim and demount a tire from the wheel rim, a control system configured to coordinate the tools to complete a tire change procedure in an automated manner, and a dead man control input element configured to be selectively operable by a human operator in respective activated and released states. The method includes: coordinating, with the control system, the plurality of tools in an automated manner to execute a selected tire change procedure when the dead man control input element is in one of the activated and released states; and suspending, with the control system, automated coordination of the tools plurality of tools when the dead man control input element is in the other of the activated and released states.

Optionally, the dead man control input element may be a foot pedal, and the method may further include monitoring a position of the foot pedal to determine one of the activated and released states. The machine may also include a graphical user interface, with the method further comprising presenting information to the human operator concerning the tire change procedure. The control system may be configured to execute a plurality of different tire change procedures and the user interface may be configured to display at least one context sensitive option when automated coordination of the tools is suspended, and the method may further include displaying a different one of at least one context sensitive option depending on the respective one of the plurality of different procedures being executed at the time that automated coordination of the tools is suspended.

Another method of changing a tire on a wheel rim has also been disclosed. The method is implemented with tire changer machine including a clamping assembly configured to receive a wheel rim, a drive assembly configured to rotate the wheel rim about an axis, a plurality of tools selectively positionable to mount a tire on the wheel rim and demount a tire from the wheel rim, a control system configured to coordinate the plurality of tools to complete a tire change procedure in an automated manner, and a user interface. The method includes: coordinating, with the control system, the plurality of tools in an automated manner to execute a selected tire change procedure; and displaying, via the user interface, context sensitive information to a human operator regarding execution of the tire change procedure.

Optionally the method may also include displaying, via the user interface, at least one context sensitive option manually selectable by a machine operator. The method may likewise include displaying, via the user interface, a preselected option for acceptance by the human operator. The method may further include: suspending automated coordination of the machine tools at the direction of the human operator; accepting at least one context sensitive option selected by the human operator while automated coordination of the machine tools is suspended; and the control system executing the selected option and thereafter continuing automated coordination of the machine tools. The method may also include presenting a visual screen display to the human operator via the graphical user interface, the screen display including at least one of an animation to show the tire change procedure being completed and a field for the display of a photographic picture or video of the tire change procedure being completed. The method may further include: learning, with the control system, a user defined aspect of a tire change procedure; and storing the user defined aspect for future recall.

An embodiment of a computer program embodied on a non-transitional computer readable medium for completing a plurality of different tire change procedures in an automated manner with a tire changing machine has also been disclosed. The program includes at least one code segment for instructing a processor that receives user provided selections for at least one of the plurality of different tire change procedures to be executed and options corresponding to each selected procedure, and, in response to the received selections: when each selection is received, execute the procedure in an automated manner according to the selected options if the selected option corresponds to an automated mode of operation of the machine, or prompt operator input for manual control of the machine if the selected option corresponds to a manual mode; and display context sensitive information regarding a procedure being executed.

Optionally, the machine may include a dead man control input element configured to be selectively changed between an activated state and a released state by the operator, and the program includes at least one code segment wherein a manual mode selection is presented only when the dead man control input element is changed from one of the activated state and the released state to the other of the activated state and the released state. At least one code segment prompting the operator to select at least one context sensitive option corresponding to a selected procedure, at least one code segment graphically displaying a portion of the machine and the procedure selected, and at least one code segment displaying a photograph or video of the procedure being executed may also be included.

As still further options, at least one code segment may be provided so that the selected procedure is automatically selected by a controller of the machine. Alternatively, at least one code segment may be provided so that the selected procedure is accepted from an operator input. At least one code segment configured to store an operator defined aspect of a tire change procedure and at least one code segment configured to accept selections via a touch screen may also be provided.

The program may reside in a memory associated with a control system of the machine.

At least one code segment configured to present a preselected option in the context sensitive information, at least one code segment configured to present a try again option in the context sensitive information, and at least one code segment configured to present a procedure selection element for selective use by the operator to select only desired steps from an otherwise standard procedure may be provided. The procedure selection element may be a procedure wheel.

A method of completing a tire bead seating procedure of a tire mounted to a wheel rim has also been disclosed. The method includes: pressurizing an interior of the tire; applying an external force to a sidewall of the tire; and rotating the wheel rim while the external force is applied.

Optionally, pressurizing the interior of the tire comprises inflating the tire to a pressure substantially equal to or below the normal operating pressure of the tire in use on a vehicle. The method may be performed with a tire changing machine, and the external force may be applied with the machine. The machine may be configured to apply the external force with at least one tool provided on the machine. The at least one tool may be a roller device, and more specifically may be a bead breaker roller. The machine may be configured to automatically apply the external force without human input.

An embodiment of a tire changing machine has also been disclosed comprising: a clamping assembly configured to receive a wheel rim; a drive assembly configured to rotate the wheel rim and tire about an axis; a plurality of tools selectively positionable to mount a tire on the wheel rim and demount a tire from the wheel rim; a reader element configured to identify at least one of a tire and a wheel rim to be used with the machine; and a control system adapted to display information for at least one of the identified tire and wheel rim to an operator.

Optionally, the control system may communicate with a database to obtain the information for display. The reader element may comprise a bar code scanner, and the reader element may be integrated with the machine.

Another embodiment of a tire change machine has been disclosed comprising: a clamping assembly configured to receive a wheel rim; a drive assembly configured to rotate the wheel rim and tire about an axis; a plurality of tools selectively positionable to mount a tire on the wheel rim and demount a tire from the wheel rim; and a control system coordinating the tools to complete a tire change procedure, the control system configured to: accept a position of at least one of the tools to perform a tire change procedure, and based on the accepted position, automatically position other ones of the plurality of tools. Optionally, the accepted position may be predefined in the control system. Alternatively, the accepted position may be user defined.

An embodiment of a tire changing machine has also been disclosed comprising: a clamping assembly configured to receive a wheel rim and tire; a drive assembly configured to rotate the wheel rim and tire about an axis; a plurality of tools selectively positionable to mount a tire on the wheel rim and demount a tire from the wheel rim; a control system coordinating the tools to complete a tire change procedure; and a lubrication element configured to lubricate at least a portion of the tire in an amounted manner.

Optionally, the lubrication element may be integrated with at least one of the plurality of tools, and more specifically may be integrated with a bead breaker tool.

Various other embodiments are disclosed and the features above may be combined in various other combinations to provide still further embodiments within the scope and spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tire changer machine comprising:
   a clamping assembly configured to receive a wheel rim;
   a drive assembly configured to rotate the wheel rim about an axis;
   a plurality of tools selectively positionable to mount a tire on the wheel rim and demount a tire from the wheel rim;
   a plurality of force and position feedback sensors associated with said plurality of tools;
   a control system configured to utilize signals received from said plurality of force and position feedback sensors to coordinate selective positioning of the plurality of tools to complete an automated tire change procedure; and
   a user interface configured to display context sensitive information to a human operator in response to an interruption of the automated tire change procedure, said context sensitive information is representative of at least one branching tire change procedure available at said point of interruption in said automated tire change procedure.

2. The tire changer machine of claim 1 further comprising:
   a dead man control input element configured to be selectively operable by the human operator in respective activated and released states, wherein the control system coordinates the plurality of tools when the dead man control input element is in one of the activated and released states, and wherein coordination of the plurality of tools is interrupted when the dead man control input element is in the other of the activated and released states.

3. The tire changer machine of claim 2, wherein the dead man control input element comprises a foot pedal.

4. The tire changer machine of claim 2, wherein the control system is configured to selectively execute a plurality of different tire change procedures.

5. The tire changer machine of claim 1, wherein the branching tire change procedure is manually selectable by the human operator.

6. The tire changer machine of claim 5, wherein the at least one branching tire change procedure is a pre-selected default option for acceptance by the human operator.

7. The tire changer machine of claim 5, wherein the control system is responsive to selection of the at least one branching tire change procedure by the human operator to establish an altered automated tire change procedure by merging the selected branching tire change procedure with any remaining steps in the automated tire change procedure and thereafter executing the altered automated tire change procedure.

8. The tire changer machine of claim 1, wherein the user interface comprises a screen display including at least one of an animation to show the automated tire change procedure being completed and a field for the display of a photographic picture or video of the automated tire change procedure being completed.

9. The tire changer machine of claim 1, wherein the control system is configured to learn a user defined aspect of the automated tire change procedure, and store the user defined aspect for future recall.

10. A method of changing a tire on a wheel rim, the method implemented with tire changer machine including a clamping assembly configured to receive a wheel rim, a drive assembly configured to rotate the wheel rim about an axis, a plurality of tools selectively positionable to mount a tire on the wheel rim and demount a tire from the wheel rim, a plurality of force and position feedback sensors associated with said plurality of tools, a control system configured to coordinate the automated operation of a plurality of tools to complete a tire change procedure, and a user interface, the method comprising:
    coordinating, with the control system and signals received from said plurality of force and position feedback sensors, the automated operation of a plurality of tools to execute a selected tire change procedure; and
    displaying in response to an interruption of said automated operation, via the user interface, context sensitive information to a human operator regarding at least one branching tire change procedure available at said point of interruption in said selected tire change procedure.

11. The method of claim 10, the tire changer machine further including a dead man control input element configured to be selectively operable by a human operator in respective activated and released states;
    wherein said step of coordinating, with the control system, the automated operation of said plurality of tools is carried out responsive to the dead man control input element in one of the activated and released states; and
    wherein said interruption of said automated operation of the plurality of tools is triggered when the dead man control input element is in the other of the activated and released states.

12. The method of claim 11, wherein the dead man control input element is a foot pedal, and the method further comprises monitoring a position of the foot pedal to determine one of the activated and released states.

13. The method of claim 10 wherein said at least one branching tire change procedure is manually selectable by the human operator.

14. The method of claim 10 wherein said at least one branching tire change procedure is a pre-selected option for acceptance by the human operator.

15. The method of claim 10, further comprising:
    interrupting said automated operation of the plurality of tools at the direction of the human operator;
    accepting at least one branching tire change procedure selected by the human operator while automated operation of the plurality of tools is suspended; and
    executing, with the control system, the selected branching tire change procedure before continuing automated operation of the plurality of tools.

16. The method of claim 10, further comprising presenting a visual screen display to the human operator via the user interface, the screen display including at least one of an animation to show the tire change procedure being completed and a field for the display of a photographic picture or video of the tire change procedure being completed.

17. The method of claim 10, further comprising:
learning, with the control system, a user defined aspect of a tire change procedure; and
storing the user defined aspect for future recall.

18. A tire changer machine comprising:
a clamping assembly configured to receive a wheel rim;
a drive assembly configured to rotate the wheel rim about an axis;
a plurality of tools selectively positionable to mount a tire on the wheel rim and demount a tire from the wheel rim;
a plurality of force and position feedback sensors associated with said plurality of tools;
a control system configured to utilize signals received from said plurality of force and position feedback sensors to coordinate automated operation of the plurality of tools to execute at least one of a plurality of different tire change procedures;
a dead man control selectively operable by a human operator to select one of an activated and released states, wherein the control system is configured to execute a selected one of the plurality of different tire change procedures when the dead man control input element is in one of the activated and released states, and wherein automated operation of the plurality of tools is suspended when the dead man control input element is in the other of the activated and released states; and
a user interface configured to display context sensitive information to a human operator which is associated with at least one of the plurality of different tire change procedures, said context sensitive information selected for display in response to the selected state of the dead man control input.

\* \* \* \* \*